US008784616B2

(12) United States Patent
Tucker

(10) Patent No.: US 8,784,616 B2
(45) Date of Patent: Jul. 22, 2014

(54) PYROLYSIS SYSTEMS, METHODS, AND RESULTANTS DERIVED THEREFROM

(75) Inventor: Richard D. Tucker, Stanfield, NC (US)

(73) Assignee: Tucker Engineering Associates, Inc., Locust, NC (US)

( * ) Notice: Subject to any disclaimer, the term of this patent is extended or adjusted under 35 U.S.C. 154(b) by 831 days.

(21) Appl. No.: 12/795,790

(22) Filed: Jun. 8, 2010

(65) Prior Publication Data

US 2011/0136971 A1 Jun. 9, 2011

Related U.S. Application Data

(63) Continuation-in-part of application No. 12/048,906, filed on Mar. 14, 2008, now Pat. No. 8,282,787.

(60) Provisional application No. 61/268,033, filed on Jun. 8, 2009.

(51) Int. Cl.
*C10B 47/30* (2006.01)
*C10B 47/44* (2006.01)
*C10B 57/12* (2006.01)

(52) U.S. Cl.
USPC ........ 201/32; 201/1; 201/20; 201/25; 201/38; 201/44; 202/118; 202/136; 202/218

(58) Field of Classification Search
USPC ............ 201/32, 33, 44, 41, 1, 2.5, 20, 38, 25; 202/105, 114, 117, 118, 135, 136, 137, 202/218; 432/118, 120, 121, 122, 152, 107
See application file for complete search history.

(56) References Cited

U.S. PATENT DOCUMENTS

| 1,742,273 | A | * | 1/1930 | Nilson | 202/218 |
| 1,884,379 | A | * | 10/1932 | Tenney | 202/118 |
| 1,957,347 | A | * | 5/1934 | McKinnon | 432/121 |
| 4,122,036 | A | * | 10/1978 | Lewis | 201/2.5 |
| 4,125,437 | A | * | 11/1978 | Bacon | 201/44 |
| 4,303,477 | A | * | 12/1981 | Schmidt et al. | 201/20 |
| 4,463,210 | A | * | 7/1984 | Steinberg et al. | 201/20 |
| 4,935,036 | A | * | 6/1990 | Ikura et al. | 201/9 |
| 5,827,352 | A | * | 10/1998 | Altman et al. | 95/58 |
| 6,039,774 | A | | 3/2000 | McMullen et al. | |

(Continued)

OTHER PUBLICATIONS

International Search Report and Written Opinion issued in Application No. PCT/US 10/37603 on Jun. 7, 2010, p. 5.

(Continued)

*Primary Examiner* — Jill Warden
*Assistant Examiner* — Joye L Woodard
(74) *Attorney, Agent, or Firm* — Clements Bernard PLLC; Christopher L. Bernard; Lawrence A. Baratta, Jr.

(57) ABSTRACT

A process for the controlled gasification of a carbonaceous feedstock includes pyrolizing the feedstock by conveying the feedstock through a retort surrounded by a plurality of successive heating chambers each comprising an axially adjustable chamber separation wall and each operated at a predetermined temperature, wherein a predetermined dwell time of the feedstock in each of the plurality of successive heating chambers is controlled by a conveyance rate of the feedstock through the retort and a position of each of the axially adjustable chamber separation walls to produce a gas product and a solid product. The gas product includes methane and noxious chemicals and the solid product includes carbon, and the pyrolizing step is controlled using feedback related to constituents of the gas product.

20 Claims, 15 Drawing Sheets

(56) References Cited

U.S. PATENT DOCUMENTS

| | | | |
|---|---|---|---|
| 6,869,467 B2 * | 3/2005 | Scheuch | 96/55 |
| 7,056,455 B2 | 6/2006 | Matyjaszewski et al. | |
| 7,169,197 B2 | 1/2007 | Serio et al. | |
| 8,306,665 B2 * | 11/2012 | Tsangaris et al. | 700/274 |
| 2006/0112639 A1 | 6/2006 | Nick et al. | |
| 2008/0286557 A1 | 11/2008 | Tucker | |

OTHER PUBLICATIONS

International Search Report and Written Opinion issued in Application No. PCT/US08/03416 on Jun. 20, 2008, 8 pp.

* cited by examiner

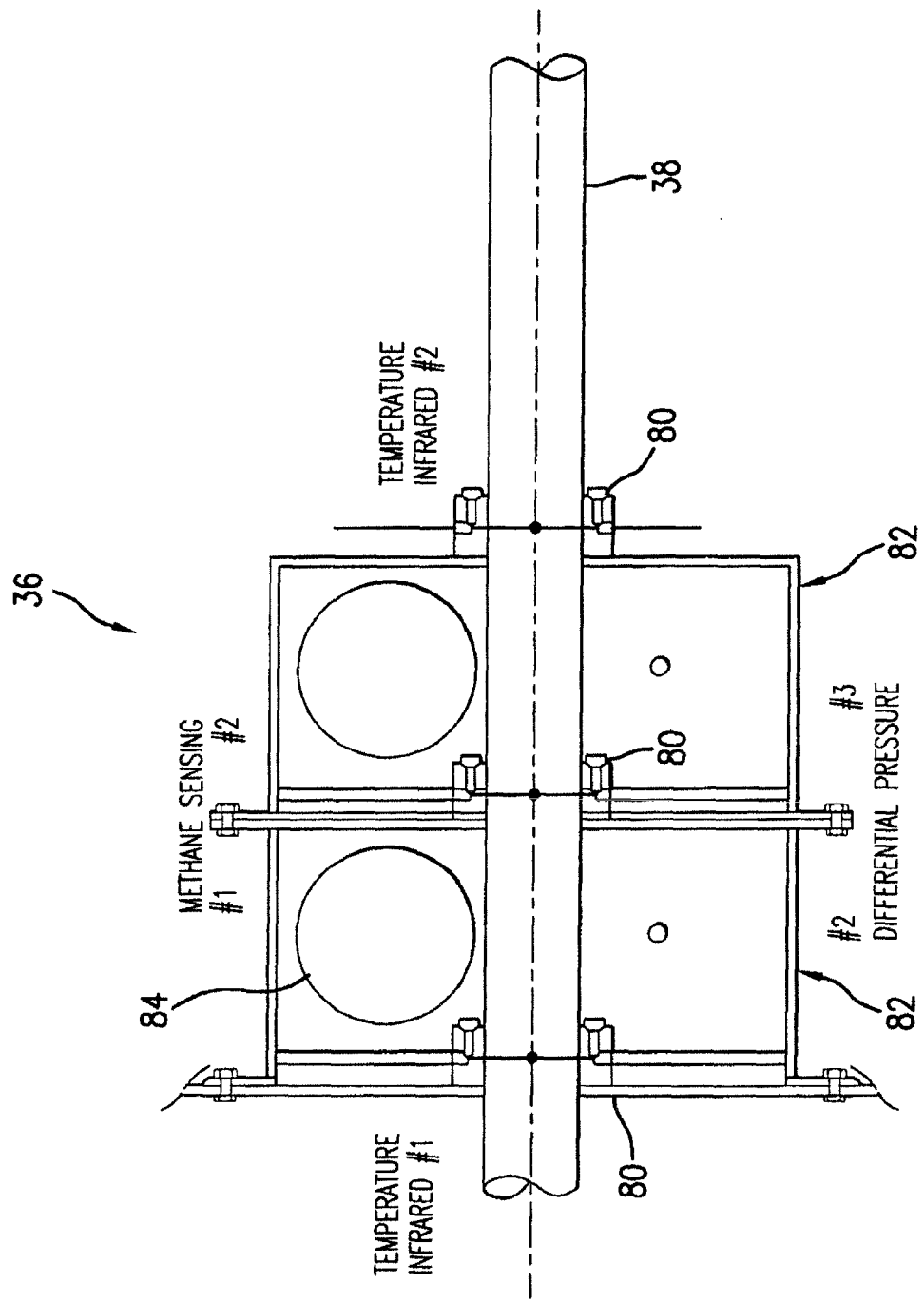

PYROLYSIS SYSTEMS, METHODS, AND RESULTANTS DERIVED THEREFROM

CROSS-REFERENCE TO RELATED APPLICATIONS

The present patent application/patent claims the benefit of priority of U.S. Provisional Patent Application No. 61/268,033 now U.S. Pat. No. 8,282,787 filed on Jun. 8, 2009, the contents of which are incorporated in full by reference herein. The present patent application/patent is a continuation-in-part of U.S. Patent Application No. 12/048,906, filed on Mar. 14, 2008.

FIELD OF THE INVENTION

The present invention relates generally to a system and method for producing methane gas and carbon products from carbonaceous feedstock.

BACKGROUND OF THE INVENTION

Techniques for the partial pyrolysis of feedstocks, as well as complete pyrolysis and gasification are known. Furthermore, high-temperature and low-temperature pyrolysis processes are known, and it is known in the art that these different processes work best with different feedstocks and give different resultants. However, obtaining consistency in the pyrolysis products has long been a problem. Prior systems have attempted to pass a gasification agent through a fluidized bed of solid; however, this requires a highly granular and reactive fuel for gasification, and, as such, is limited in its application. Other systems for pyrolysis pass a gasification agent through a solid bed of fuel, that requires a non-caking fuel with high mechanical strength. Likewise, high and low-temperature pyrolysis processes are each better suited to pyrolizing different feedstocks, limiting the range of feedstocks that prior art pyrolysis systems may process. As such, there is a need in the art for pyrolysis systems that may accept a wide variety of fuels.

Furthermore, though both high-temperature and low-temperature pyrolysis processes produce combustible, high-BTU materials, these resultant combustibles are often low grade, and they often contain harmful impurities, such as mercury and sulfur, that may contaminate the environment when these materials are combusted. As such, there remains a need in the art for controlled methods for purifying the resultant products and sequestering noxious materials internal to and external to the pyrolysis process in order to prevent them from entering into the environment.

Furthermore, prior art systems do not provide efficient heat transfer to feedstocks, that exhibit multiple lobes in their specific heat signatures. Therefore, there remains a need in the art for a method of matching the heat transfer rate and dwell timing of the pyrolysis process to that of the particular feedstock-specific heat complex function to provide a greatly improved thermal efficiency of the pyrolysis system.

Furthermore, though the acceptable input organic or synthetic materials for pyrolysis have ranged widely in the past, there remains a need for pyrolysis systems that may process municipal solid waste (MSW) in order to eliminate landfills, waste organic and synthetic materials, and animal waste. There also remains a need for clean, efficient systems for the gasification of coal to globally reduce the dependence on oil drilled and pumped from the Earth's crust.

BRIEF SUMMARY OF THE INVENTION

It is an object of the present invention to overcome deficiencies in the prior art by providing processes, systems, and components for the gasification of carbonaceous feedstocks by pyrolysis.

In various embodiments, the present invention provides a system and process for the resultant gas constituent-controlled gasification of a carbonaceous feedstock and uses feedback loop-controlled pyrolysis to produce a stable and predictable gas product from a variable or unknown feedstock, such as MSW, that may include methane, ethane, and other desirable hydrocarbon gases, and a solid product, that includes activated carbon or carbon. The gas product is initially cleaned by a controlled high-temperature chemical sequestering process. The gas product may then be further cleaned using at least a portion of the activated carbon from the solid product as a filtering medium. In an embodiment, at least some of the noxious chemicals are sequestered or removed from the gas product initially in the high temperature pyrolysis process by monitoring the resultant gas and utilizing a control loop to inject specific amounts of a sequestration agent, and then also in one or more cleaning steps using activated carbon as a filtering medium. In a further embodiment, the filtering steps are performed in stages using activated carbon at different temperatures. Further, the resultant gas constituent monitoring and control system maintains a constant BTU per cubic foot value through controlled injection of a viscous organic material. The resultant gas constituent monitoring and control system controls the methane level of the resultant gas and the carbon activation level (iodine absorption number) through controlled injections of steam. Also, the resultant gas constituent monitoring and control system controls the non-wetting (extremely-low iodine absorption number) condition of the resultant carbon through controlled injection of silica or other non-wetting agents. A high-temperature pyrolysis system that produces activated carbon may be combined with another high-temperature pyrolysis system that does not produce activated carbon to provide filtering of noxious compounds using activated carbon from the first high-temperature pyrolysis system. A high-temperature pyrolysis system may be combined with one or more low-temperature feedstock conversion processes, such that waste heat from the high-temperature pyrolysis system is used to operate the low-temperature process. A novel non-wetting carbon having pores fused with silica may be produced from using the system and process. A novel carbon-reinforced and moisture-resistant plastic lumber may be produced utilizing the non-wetting carbon as the strengthening and filler components. The communications and control of the system and process uses an ISO layered communications stack with Smart Grid selected communications protocols and uses IEEE 1703 over IP or other lower-layer communications media for WAN and LAN interface.

In accordance with an aspect of the present invention, a process for the gasification of a carbonaceous feedstock involves pyrolyzing at least one of a coal, biomass, animal waste, or MSW stream to produce a gas product, that may include methane and a solid product, that includes activated carbon or non-activated carbon. Within the internal high-temperature process phase, a controlled chemical process, "Lewis Acid Site" sequestration, occurs to bind sulfur and mercury to the resultant carbon elements. The gas product is then further filtered using resultant activated carbon as a filtering medium. In an embodiment, the first noxious elements and compounds are sequestered in the high-temperature process, then at least some of the remaining noxious chemicals are sequestered or removed from the gas product in one or more filtering steps using the resultant activated carbon as a filtering medium. In a further embodiment, the filtering steps are performed in stages using activated carbon at different temperatures.

In accordance with another aspect of the present invention, a system for the gasification of a carbonaceous feedstock includes an airlock feeding device, an injector of steam, an injector of "Lewis Acid Site" sequestration agents, an injector of a viscous and high BTU-value organic material for augmenting the resultant gas BTU density, an injector of "non-wetting carbon" agents, a pyrolysis unit, a resultant chamber, a gas analysis control unit, a carbon analysis control unit, an internal heat and pressure control unit, a specific heat-matching control unit, and one or more filters. The airlock feeding device meters the feedstock into the pyrolysis process, avoiding any introduction of outside atmospheric gases, especially that of oxygen. The injector of steam emits specific amounts of moisture in the form of steam for slight positive pressure behind the airlock and hydrogen production in steam reformation. The injector of "Lewis Acid Site" sequestration agents emits complementary amounts of the agents into the process to augment any natural amounts found in the feedstock and is controlled through the gas analysis control unit. The injector of viscous organic material is controlled by the gas analysis control unit to allow blending solid and viscous/liquid organic feedstocks and to achieve a consistent value of BTU per volume of gas, that, in most cases, would be that of the value of "natural gas," 1050 BTU/cubic foot. The injector of "non-wetting carbon" agents injects (if commanded) complementary amounts of the agents into the process to augment any natural amounts found in the feedstock and is controlled through the resultant carbon analysis control unit. The pyrolysis unit includes a heater, a conveyor for transporting the carbonaceous feedstock through the heater, and a resultant chamber disposed downstream of the conveyor for separating gaseous and solid pyrolysis products. Each filter sequesters noxious materials from the gaseous products, and preferably uses at least some of the solid pyrolysis products to filter at least a portion of the gaseous pyrolysis products. In an embodiment, the conveyor in the pyrolysis unit includes a counter-rotating auger and retort. In yet another embodiment, the heating chamber may include a burner and an exhaust laterally offset and directed perpendicular to the longitudinal axis of the auger retort in order to create a generally circular flow of heat around the auger retort. In a further embodiment, the resultant chamber is maintained at a positive pressure, preferably by means of at least one of a steam injection at the feed end of the pyrolysis unit and a vacuum blower located downstream of the resultant chamber and the filter. In one embodiment, the system includes at least one cooling/heating jacket for bringing activated carbon in the solids product to a predetermined temperature prior to using the activated carbon to filter the gaseous pyrolysis products; preferably, the system includes multiple cooling/heating jackets disposed in between the filters. In a further embodiment, a second auger rotatably disposed within a tubular member is provided for conveying the solid pyrolysis products to the filtering portion of the system through the cooling/heating jackets and the plurality of filters.

In accordance with a further aspect of the present invention, a pyrolysis unit for the gasification of a feedstock includes a plurality of heating chambers that may be individually controlled to achieve thermally-efficient pyrolysis of a feedstock with a non-linear specific heat profile with multiple differentiated lobes as a function of temperature. In an embodiment, the multiple chambers are adjusted for appropriate temperatures and dwell times through individual chamber burner temperatures and individual chamber axial lengths to match the thermal requirements of each of the specific heat lobes of the feedstock. In yet another embodiment, the chamber axial lengths may be adjustable utilizing mobile separation walls between the individual chambers. In another embodiment, the adjustable separation walls between the individual chambers may be controlled on a real time basis through a specific heat lobe matching control unit. In another embodiment, the feedstock is conveyed through the heating chambers using an auger disposed within a tubular retort that is either fixed or rotatable. In an embodiment, the tubular retort is rotatable in a direction counter to the direction of rotation of the auger to reduce hot spots and improve heat transfer by inducing a more turbulent flow. Each heating chamber of the pyrolysis unit preferably includes a heating element in the form of a burner that is oriented perpendicular to the longitudinal axis of the retort and laterally offset to induce a generally circular heated flow around the retort. An exhaust is preferably formed in the chamber opposite the burner and a baffle or partition is positioned between the burner and the exhaust to promote the circular flow. In a preferred embodiment, each heating chamber includes a pair of burners disposed on opposite sides of the retort and a pair of exhausts disposed opposite the burners. In an embodiment, means are provided for maintaining a slight positive pressure in the retort. Some suitable means for maintaining a minimal positive pressure include at least one of a steam injection line in communication with an air lock feeder and a downstream vacuum blower.

In accordance with a still further aspect of the present invention, a combined system includes at least two pyrolysis units to widen the range of feedstocks that may be accepted for pyrolysis. In one embodiment, the first pyrolysis unit accepts a feedstock consisting of a biomass, an animal waste, a MSW stream, or other feedstock that, when pyrolyzed, results in a gaseous resultant and a solid product that includes activated carbon upon pyrolysis. The second pyrolysis unit accepts a feedstock consisting of coal or other carbonaceous material that, when pyrolyzed, results in gaseous resultants and a solid product that does not include activated carbon. In a further embodiment, the system includes one or more filters for removing noxious materials from the gaseous resultants. In a further embodiment, the filter includes activated carbon, at least a portion of which is the activated carbon resultant from the first pyrolysis unit. In another embodiment, the first pyrolysis unit is a high-temperature pyrolysis unit that generates waste heat, and the second pyrolysis unit is a low-temperature pyrolysis unit that operates using at least a portion of the waste heat generated by the high-temperature pyrolysis unit. In a further embodiment, the high-temperature pyrolysis unit operates at temperatures between about 700° F. and about 2300° F., while the low-temperature pyrolysis unit operates at temperatures between about 300° F. and about 1500° F.

In accordance with a still further aspect of the present invention, a method for cleaning used aluminum cans or the like of the paints, lacquers, and debris is provided, with the resultant billets of aluminum of feedstock grade, utilizing the waste heat and closed loop gas purification system of the high-temperature pyrolysis system to augment a second low-temperature pyrolysis unit that drives volatiles, paints, and other debris away from the aluminum nuggets passing through the process, and captures the resultant noxious gases and chemical compounds in the multiple and closed loop activated carbon sorbent beds and anneals/melts the remaining aluminum nuggets into a cleaned molten state to pour into billets.

In accordance with a still further aspect of the present invention, a method for generating carbon nanostructures involves pyrolyzing a carbonaceous feedstock in a high-temperature pyrolysis unit and separating the pyrolysis products into resultant gases and resultant solids. Carbon nanostructures are then removed from the gaseous product by clarifying the gaseous materials in a nanostructure collection device, such as a dust clarifier. In one embodiment, the collection device is a dust clarifier that imparts an electrostatic charge to the carbon nanostructures, that are then captured on oppositely-charged plates. Another aspect of the invention is a system comprising a high-temperature pyrolysis unit, a means for separating gaseous and solid pyrolysis products, and a dust clarifier for removing carbon dust from the gaseous products.

In accordance with a still further aspect of the present invention, a vapor barrier seal suitable for high-temperature applications includes at least two vapor barrier collars and at least one detecting chamber that includes a sensor for detecting at least one of gases and gas pressures. The two vapor barrier collars encircle a shaft, such as an auger shaft, and the detecting chamber is disposed between the two vapor barrier collars. In one embodiment, each vapor barrier collar is a stainless steel collar that encircles a shaft, with an annular groove formed along the inner circumference of the collar. Vapor pressure is delivered to the annular groove through holes in the collar. In an embodiment, the detecting chamber sensor determines if undesirable gases have passed through one of the vapor barrier collars, and if undesirable gases are detected, then additional vapor pressure is applied to one or more of the vapor barrier collars, thereby encircling the shaft with vapor. Another aspect of the invention is a method for preventing gases from escaping around a shaft while allowing the shaft to rotate freely, including the steps of mounting a shaft so that a portion of the shaft rotates within a detecting chamber and positioning vapor barrier collars around the shaft at opposite ends of the chamber. The method also includes detecting undesirable gases in the chamber, and raising the pressure in the vapor barrier collar to prevent undesirable gases from traveling through the vapor barrier collar.

In accordance with a still further aspect of the present invention, a non-wetting carbon material is produced by rapid pyrolysis of coal between about 900° F. and about 2300° F. The non-wetting carbon is characterized by a nearly complete resistance to absorption of other materials, as well as nearly complete resistance to moisture. In accordance with a further aspect of the present invention, the non-wetting carbon may be used to generate a composite lumber as well as other products that include non-wetting carbon as filler material and plastic as a binder. The novel plastic lumber product exhibits the properties of being waterproof, fungus, and mildew resistant and having a low physical expansion coefficient to heat and moisture. It is believed that the non-wetting carbon results from producing cavities within the fixed carbon of the coal feedstock during extremely fast pyrolyzation and subsequently sealing the cavities by fusing resident silica or by controlled addition of finely ground/atomized silica in any organic feed stocks lacking enough silica for the non-wetting properties. The resultant carbon is analyzed immediately after passing through the resultant chamber with feedback control through the carbon analysis control unit to the silica or other "non-wetting carbon" agent injector into the pyrolysis unit feed throat.

In accordance with a still further aspect of the present invention, layers of communications control and data gathering control at least one of the pieces of equipment or machines, groups of machines within a plant, an entire plant operation, and a group of plants within a region. In an embodiment, the control system provides uniform and standard instrumentation and data for the plant operation on a regional or global basis. One objective is to provide the energy and product data available from these plants in a historical block of profile data such that the gas and/or electrical energy data may be easily conformed to trading floor data models. In an embodiment, standard communication protocols are used to provide seamless integration of energy generation and energy metering to advanced metering infrastructure. These may be managed through the use of standard or manufacturer defined tables, user defined tables, extended user defined tables, standard procedures and manufacturer procedures, pending table and pending procedure, bi-directional message and uni-directional messages (blurts). Data elements may also be encoded for use in global inter-system exchange, importation and exportation of control, data, and parameters. In an embodiment, encoding is accomplished using file structures that define a communication context that is capable of connecting individual sensors, machines, plants, municipalities, geographical regions, regions of plants, and/or trading floors and other entities that use energy block data and time-critical sensory data. In an embodiment, an integrated modular pyrolysis system includes an MMS (Modular Management System) and MDMS (Meter Data Management System) and databases to provide site independent, network independent end-to-end transparent real-time communication and control system. The system may make use of transparent bridging enhancement technology that allows the control system to interoperate securely, privately, and globally, without undesired degradation of communication system performance. Transparent speed enhancement signaling connections may also be used between sensor, control and management devices.

Other objects and advantages of the present invention will become apparent to those of ordinary skill in the art upon review of the detailed description of the preferred embodiments and the attached drawing figures, in which like reference numerals are used to represent like components.

BRIEF DESCRIPTION OF THE DRAWINGS

The present invention is illustrated and described herein with reference to the various drawings, in which like reference numbers are used to denote like system components/method steps, as appropriate.

FIG. 3A is a cross-sectional view of a vapor barrier seal system for a high-temperature process according to an embodiment of the present invention.

DETAILED DESCRIPTION OF THE INVENTION

Figure 1A:
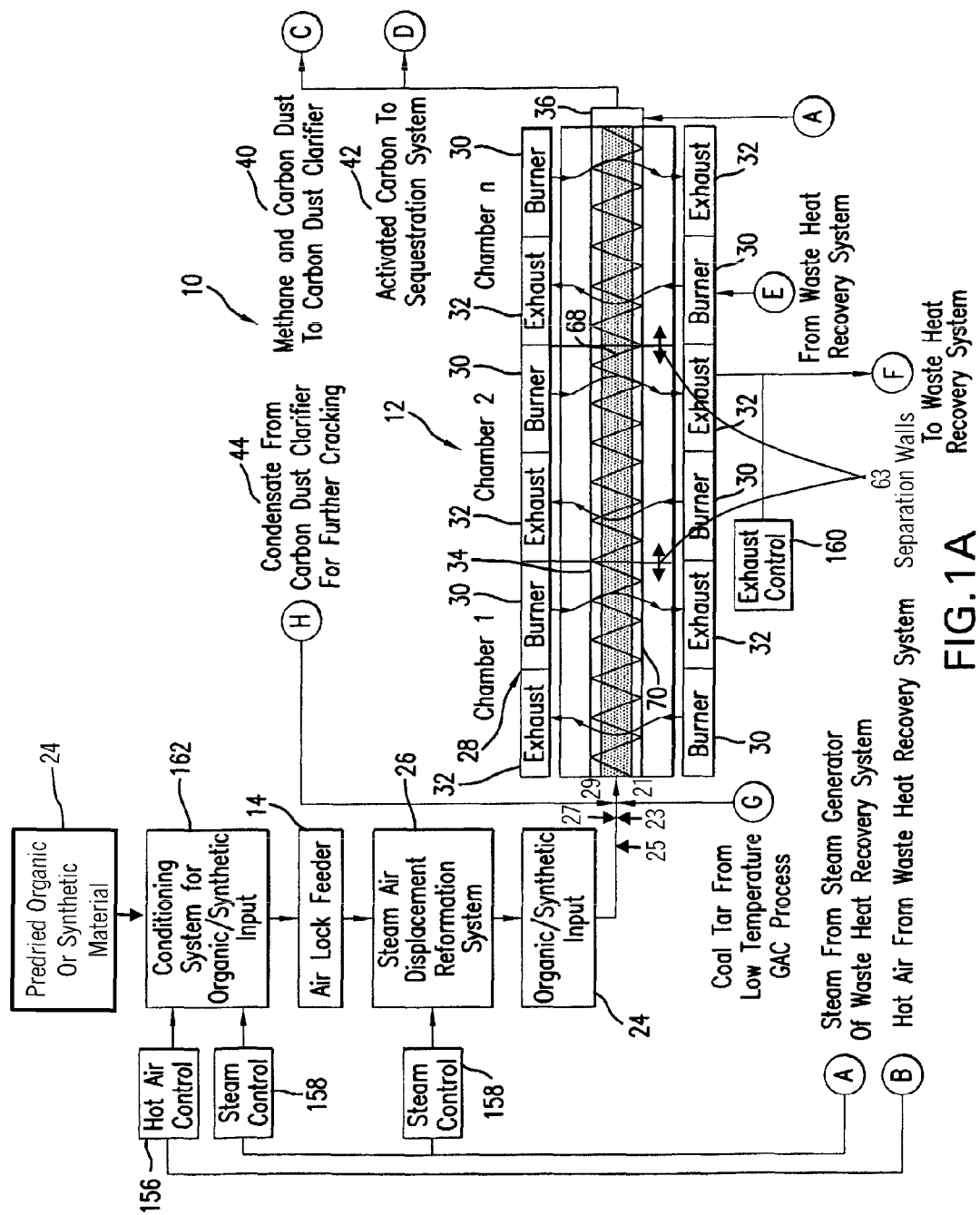
FIG. 1A is a schematic diagram showing a high-temperature pyrolysis unit for use in a pyrolysis system and method according to an embodiment of the present invention.

FIGS. 1A-1F are schematic diagrams showing components of a combined cycle carbonaceous feedstock conversion system 10 according to an embodiment of the present invention. The system 10 includes a high-temperature pyrolysis unit 12 that receives carbonaceous feedstock through an airlock feeder 14 with injector 25 (FIG. 2A) providing a sequestration agent for controlled internal sequestration of noxious elements and compounds that produce a sulfur and mercury-free gas product containing methane and a solid product containing activated carbon or non-activated carbon, depending upon the type of feedstock and whether "non-wetting" agent injector 27 (FIG. 2A) is used to induce the non-wetting action. Also, the system 10 includes further injectors of viscous organic material 23 (FIG. 2A) for enhanced gas energy content and a steam injector 26 for positive pressure and steam reformation. The system 10 further includes a dust clarifier 16 for collecting carbon nanostructures from the gas and a series of filtering units 18 for further removal of noxious components from the gas using activated carbon from the pyrolysis unit 12. Also shown in FIGS. 1A-1F are an optional low-temperature batch distillation system 20 and a low-temperature system 22 that are operated using waste heat from the high-temperature pyrolysis unit 12.

In use, organic or synthetic feedstock 24 is conditioned by drying it to a preferred moisture level and then introduced to the system 10 through the airlock feeder 14, and ambient air is displaced through the use of a steam injection system 26, that also provides augmented moisture for steam reformation needed for methane production. The organic or synthetic feedstock 24 enters the high-temperature pyrolysis unit 12, where the organic or synthetic feedstock 24 is pyrolized into resultant products. Also, the sequestration agent is injected 25 with the feedstock. During the high-temperature pyrolyzation process of gasification, immediate cleansing of the gas occurs through the "Lewis Acid Site" sequestration of the stable Hg 2+ compounds, such as HGS. The high-temperature pyrolysis unit 12 includes 1 to "n" heating chambers 28, each chamber having burners 30, axially adjustable chamber separation walls 63, and exhaust ports 32. Each heating chamber 28 may be operated at a different temperature and different dwell time than the other chambers, thus allowing greater control over the pyrolysis process and the resultant products. The high-temperature pyrolysis unit 12 also includes a conveyor 34 in the form of an auger/retort mechanism for continuously agitating and moving the material 24 for pyrolysis through the multiple heating chambers 28 of the pyrolysis unit 12. An advanced high-temperature seal system 36 allows the pyrolysis auger shaft 38 to penetrate the high-temperature pyrolysis unit 12 while preventing the escape of resultant gases into the atmosphere.

The resultant products of the high-temperature pyrolysis process include a gas product 40 made up of a mixture of methane gas, ethane gas, and other desirable hydrocarbon gases, and carbon dust, and a solid product 42 including activated carbon in the case of biomass or MSW feedstock, or non-activated carbon in the case of coal feedstock or other feedstocks injected with non-wetting agent(s) 27, such as atomized silica. These products are separated, and the methane gas/carbon dust mixture is then passed to a dust clarifier 16, that separates carbon dust from the methane gas. Condensates of the clarification process that require further pyrolysis 44 are removed from the dust clarifier 16 and reintroduced into the high-temperature pyrolysis unit 12. Other collected carbon 45, including carbon nanostructures, are removed and may be packaged for sale and/or shipment.

According to one embodiment of the invention, the resultant gas 40 is passed through a systematic means of further extracting noxious components, that includes filtering the resultant gas 40 using one or more filtering units 18 containing activated carbon. In the case of biomass or MSW feedstock, activated carbon 18 from the resultant chamber may advantageously be used in the filtering units 46. According to a particular embodiment of the invention, the activated carbon 42 is initially brought to a first temperature in a cooling jacket 48 prior to the filtering step. The filtering step may include multiple stages of filtering at different temperatures, with each filtering step at each temperature serving to remove and sequester particular impurities from the resultant methane gas. By passing the impure gas through activated carbon at two or more different temperatures, impurities may be selectively removed and sequestered from the gas. For instance, stable $Hg^{2+}$ compounds, such as HgS, are captured at higher temperatures within the active pyrolysis process, while less-stable $Hg^+$ compounds, such as HgCl, are captured at lower temperatures applicable for the external filtering sorbent bed stages. After filtering the partially purified resultant gas through the activated carbon, the purified gas may then be compressed by a compressor 50 and stored in gas storage 52.

When used to filter the resultant gas, the activated carbon 42 absorbs and sequesters certain noxious components or materials. In one embodiment, these noxious components may be removed by passing the activated carbon through a magnetic drum metal separator 54, that will remove magnetic materials from the activated carbon 42. In a further embodiment, the activated carbon is then graded and separated, and it may then be packaged for shipment or sale.

In one embodiment, the excess heat from the exhaust 32 of one or more of the heating chambers 28 may enter into a waste heat recovery system 56. This waste heat recovery system may be coupled, through a heat exchanger 58, with a steam generator 60, that will generate steam for use in other steps of the process. Likewise, the waste heat recovery system 56 may be used to generate heat for one or more low-temperature pyrolysis processes, such as low-temperature batch pyrolysis process 20. This allows the system to process different feedstocks simultaneously. The low temperature pyrolysis process may be used for continuance of the primary gasification unit feedstock dwell time for more efficient gasification, liquefaction of coal, vacuum distillation of automobile tires, closed-loop cleaning of aluminum cans, pyrolysis of bulky feedstocks unsuitable for use in the continuous high-temperature pyrolysis process, or feedstocks that are relatively free of noxious components.

Figure 2A:
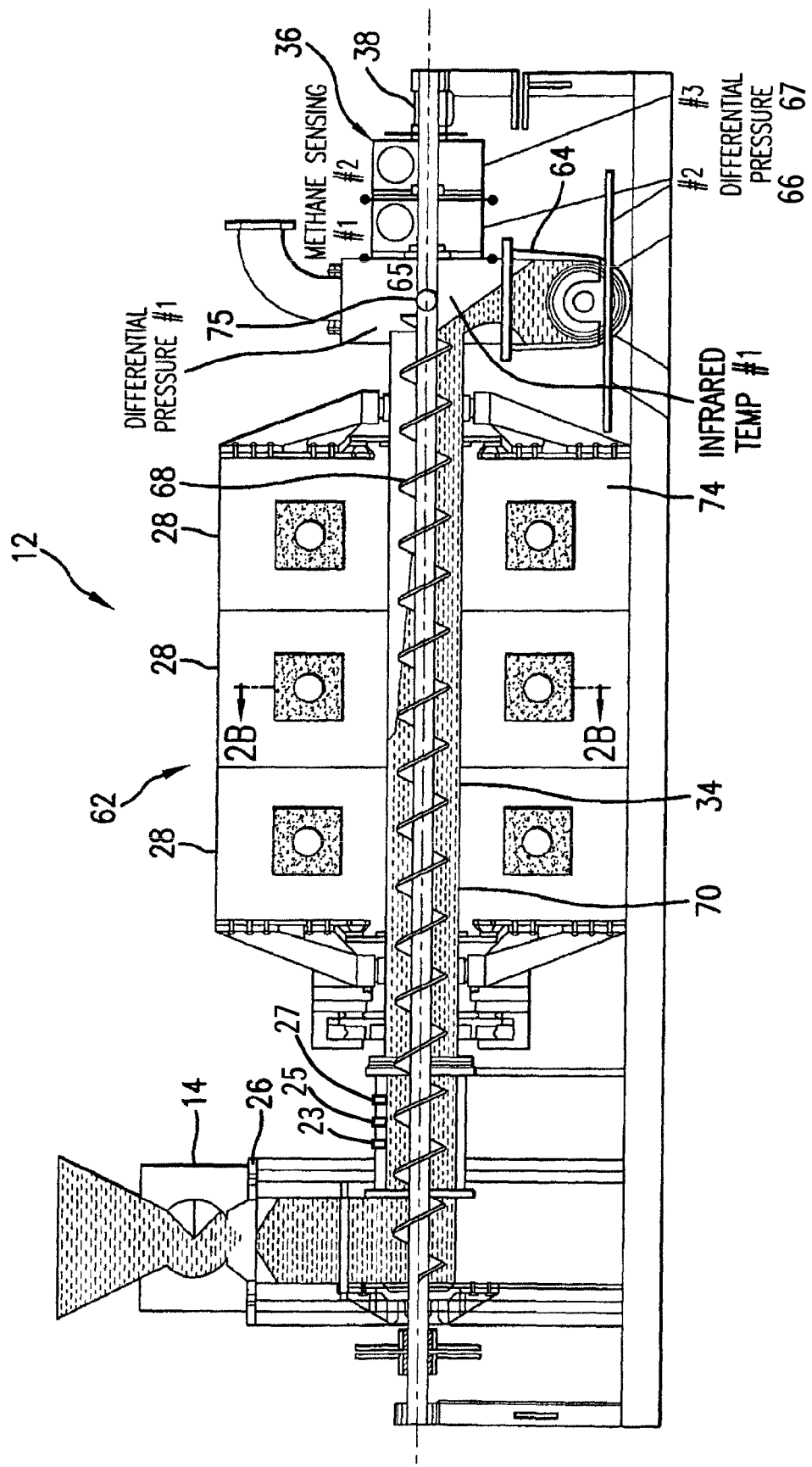
FIG. 2A is a cross-sectional view of a high-temperature pyrolysis unit, or low temperature pyrolysis unit for aluminum cleaning, according to an embodiment of the present invention.

FIG. 2A shows a high-temperature pyrolysis unit 12 in combination with an airlock feeder 14 and multiple controlled agent injectors 23, 25, 26, 27 according to an embodiment of the present invention. The high-temperature pyrolysis unit 12 includes a multi-chamber heating unit 62, a conveyor 34, a resultant chamber 64 for separation of gaseous 40 and solid 42 resultants, and a high-temperature vapor seal system 36. The high-temperature pyrolysis unit 12 is sealed from the ambient environment, thereby limiting oxygen intrusion into and heat expulsion out of the pyrolysis process. Each chamber of the multi-chamber heating unit 62 contains at least one burner 30 and at least one exhaust system 32 to provide energy to pyrolize the feedstock. Also, each chamber may have different axial lengths with an adjustable chamber wall 63. The burner 30 and exhaust 32 pair are configured to heat a retort 70 to a temperature between about 700° F. and about 2300° F. Feedstock is moved through the multi-chamber heating unit by conveyor 34, that preferably includes an auger 68 rotatably disposed within a tubular retort 70, as shown. Retort 70 may be stationary or fixed in place, but is preferably rotatable about a longitudinal axis. Preferably, the retort 70 is rotatable in a direction counter to the direction of rotation of the auger 68 to improve heat transfer. More specifically, rotating the retort 70 and the auger 68 in opposite directions increases the turbulence of the materials being pyrolized, eliminates hot-spots, and ensures greater consistency in the reaction products. In one embodiment, the auger 68 may have a special flighting design that allows for full conveyance of the feedstock in the receiving length of the retort and less than full conveyance in the processing length of the retort. This assists in the isolation of the internal gaseous reactions from the ambient environment. In another embodiment, the auger/retort system 34 has a special conveyance design that enlarges the cavity of the retort 70 and expands the auger 68 flighting after the atmospheric isolation is accomplished in the feed throat portion of the compressing auger section conveyance of the high-temperature pyrolysis unit. The auger flighting design plugs the receiver length through the injection of feedstock, steam, or another inert gas just after an air lock 14, thereby creating the slight positive pressure differential into the organic or synthetic material intake area. Thus, the only gaseous exchange through the air lock 14 is the steam or other inert gas traversing from the interior of the intake area through the air lock to the ambient atmosphere. The auger shaft 38 penetrates the high-temperature pyrolysis unit 12 through a high-temperature vapor seal system 36, that allows the auger shaft 38 to penetrate the high-temperature pyrolysis unit while preventing gaseous resultants from escaping the pyrolysis unit. The high-temperature pyrolysis process generates a mixture of gaseous and solid products, with the gaseous products 40 including methane, ethane, and other hydrocarbon gases. For certain feed stocks, such as MSW or biomass, the solid product 42 includes at least some activated carbon.

As mentioned above, the coal, biomass, animal waste, or MSW feedstock 24 is introduced into the high-temperature pyrolysis unit 12 through the airlock feeder 14, that is combined with a pressure injection system 26. The pressure injection system 26 serves to create a slight positive pressure inside the carbonaceous feedstock areas, such that the only gaseous exchange through the airlock feeder 14 is the gas provided by the pressure injection system 26 traversing the airlock to the outside ambient air. In a preferred embodiment, a positive pressure between about 1 kPa and 10 kPa is maintained in the high-temperature pyrolysis unit 12. Referring to FIG. 1A, optionally, the organic or synthetic feedstock 24 is the end product after organic or synthetic input has been processed through a drying conditioning system 162. In order to exclude oxygen, this differential pressure may be created by the injection of steam or inert gases, though steam is preferred for both its low cost and because it provides hydrogen atoms useful for chemical reactions in the pyrolysis process. At least some steam is preferably introduced into the pyrolysis unit 12 to provide sufficient hydrogen atoms for the formation of carbon-hydrogen bonds and resultant methane and other hydrocarbon gases.

Steam injection provides an elevated pressure between the air lock 14 and the interior endothermic reaction. The heavy organic gas molecules produced need more hydrogen to produce $CH_4$. Too much steam reformation results in CO that is separated out later by reverse osmosis. Optimum steam reformation means 26 are used in order to provide only the sufficient amount of hydrogen atoms necessary to satisfy the production of methane, ethane, and other desired carbon-hydrogen molecules. Advantageously, the conditioning system 162 and steam air displacement reformation system 26 use hot air and steam from the waste heat recovery system, described in greater detail herein below. Accordingly, appropriate hot air controls 156 and steam controls 158 are used. The organic or synthetic feedstock 24 may include pelletized coal, solid waste, animal waste, or any other long-chain carbon-hydrogen materials. The resultants may include methane gas, ethane gas, and many other carbon-hydrogen molecules, activated carbon resultants, carbon nanostructures including cylindrical fullerene ("nano-tube") and $C_{60}$ Buckminster-fullerene ("Bucky ball") carbon resultants, activated carbon resultants, novel non-wetting carbon resultants described in greater detail herein below, and many other carbon resultants. Gaseous resultants 40 are transported from the continuous high temperature pyrolysis unit 12 through an appropriate gas conveyance device and solid resultants are transported from the continuous high temperature pyrolysis unit 12 through an appropriate solid conveyance device. In order to enhance the efficiency and effectiveness of the continuous high temperature pyrolysis unit 12, the organic or synthetic feedstock 24 may be combined with the condensate 44 from a carbon dust clarifier 16, described in greater detail herein below, or other viscous/liquid organic material or coal tar 103 from a low temperature granular activated carbon (GAC) process 22, also described in greater detail herein below.

Figure 2B:
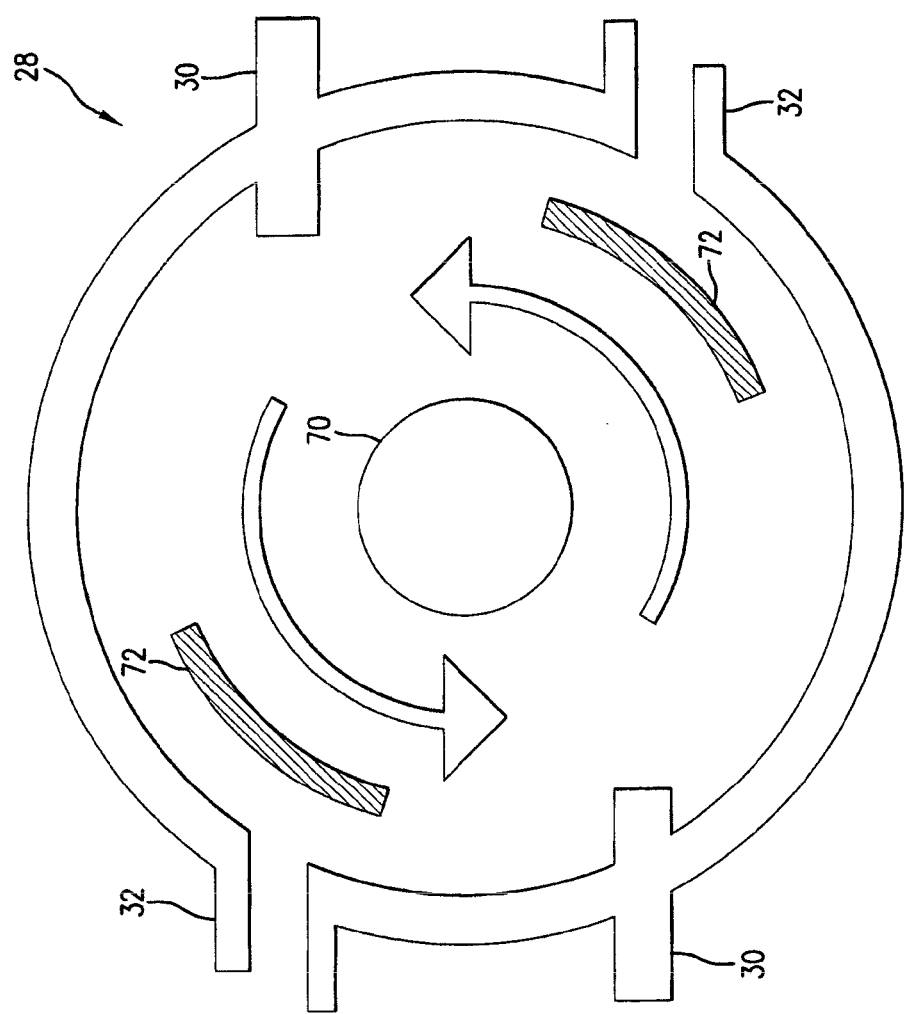
FIG. 2B is a cross-sectional view of a heating chamber of a high-temperature pyrolysis unit according to an embodiment of the present invention.

Referring again to FIG. 2A, the heating unit 62 preferably includes at least one heating chamber 28, with at least one burner 30 and at least one exhaust 32, and preferably at least two burners 30 and at least two exhausts 32 and static or axially adjustable chamber walls 63. FIG. 2B shows a schematic drawing of the configuration of the burners 30 in relation to the exhausts 32 and the heating retort 70. The burner 30 and exhaust 32 are preferably laterally offset from and perpendicular to the longitudinal axis of the counter-rotating inductive heating retort 70, that is part of the conveyor 34, in such a way as to create a swirling airflow with tangential components around the retort. Baffles 72 are preferably interspersed between each burner 30 and an opposed exhaust 32 in order to increase the amount of time the heat from the burners 30 is in contact with the retort 70. The swirling airflow surrounding the counter-rotating inductive retort 70 creates a more even distribution of heat, that helps to eliminate hotspots in pyrolysis and achieves greater homogeneity of reaction products. Referring again to FIG. 2A, the heating chambers 28 preferably also include at least one layer of refractory material 74 (e.g. 1 to n layers) poured and supported by high-temperature welded rods (not shown) or other support shapes embedded in the refractory layer(s) to form the interior high temperature chamber, resulting in high efficiency heating chambers that transfer minimal heat to the exterior.

Each of the heating chambers 28 is temperature-controlled and dwell time-controlled, such that the dwell time of the organic or synthetic material(s) in each temperature zone results in a predictable chemical or physical reaction/change. Although a single chamber may be used, having multiple heating chambers 28 in the pyrolysis unit 12 allows the reactants in the pyrolysis unit to be subjected to different heating profiles over the course of pyrolysis. In one embodiment, having multiple chambers 28 with static or axially adjustable chamber walls 63 allows one to subject a feedstock to rapid high-temperature pyrolysis followed by lower temperature stages. In one embodiment, the dwell time of the organic or synthetic input in each of the one or more heating chambers 28 is between about 40 seconds and about 90 seconds. In another embodiment, each of the one to "n" heated chambers 28 is maintained at a temperature of between about 700° F. and about 2300° F. In another embodiment, the feedstock 24 is subjected in a first heating chamber to a higher temperature, followed by subjecting the resultants of the first heating to a temperature lower than the first temperature. In another embodiment, the dwell time through each chamber and its associated temperature is adjustable through adjustable chamber separation walls 63 to match complex specific heat vs time functions of some feedstocks. As one may see from these embodiments, having multiple chambers 28 with static or adjustable chamber walls 63 and different temperatures in the high-temperature pyrolysis unit 12 is advantageous because it allows the high-temperature pyrolysis unit to process a wide range of feedstocks with improved thermal efficiency without costly modification or recalibration of the system. Furthermore, having multiple chambers 28 in the high-temperature pyrolysis unit 12 allows one to pyrolyze different feedstock material in the high-temperature pyrolysis unit without interruption of the continuous operation of the high-temperature pyrolysis unit since the chambers' temperatures and dwell times and resultant gas constituents may be monitored and adjusted based on the feedstock.

Referring still to FIG. 2A, the high-temperature pyrolysis unit 12 also includes a resultant chamber 64 for monitoring the pyrolysis products. In a preferred embodiment, the resultant chamber 64 is equipped with one or more infrared sensors 75 that measure the temperature and elemental/compound constituent spectrum analysis of the resultants for feedback data for quality control purposes to the communication control modules, described herein below. Gaseous products of pyrolysis 40, including but not limited to methane, ethane, butane, and other low molecular weight hydrocarbons, and solid products of pyrolysis, that may include activated carbon, may be separated in the resultant chamber 64 and directed to further steps in the system. The gaseous products 40 are preferably drawn through the system by use of a vacuum blower 76 located downstream of the filtering stages, as shown in FIG. 1C. In one embodiment, the vacuum blower 76 may have an automated bypass valve 78 in communication with the resultant chamber and controlled by a computerized system in response to data from one or more of the sensors in the resultant chamber to maintain a positive pressure by at least partially opening and closing the valve. The vacuum blower 76 is preferably placed towards the end of the system to maintain a slight positive pressure in the pyrolysis unit 12 and a sufficient negative pressure at the end of the system to drive the resultant gases through the remaining steps or stages of the system. Preferably, the slight positive pressure in the pyrolysis unit 12 is between about 1 kPa and about 10 kPa. present in the pyrolysis unit at a particular time. Thus, one could feed MSW into the high-temperature pyrolysis unit 12, followed by biomass, followed by coal tars, and the system could be adjusted "on the fly" to account for the different specific heats and heating profiles of these feedstocks, as well as the different temperatures and dwell times required to pyrolize these materials.

Referring still to FIG. 2A, a further aspect of the present invention is a durable and safe high-temperature sealed system 36 that allows the very hot auger shaft 38 to penetrate the high-temperature pyrolysis unit 12 without allowing resultant gases 40 to escape into the atmosphere. In an embodiment, the shaft of the auger penetrates the high-temperature pyrolysis unit through a steam-driven vapor barrier seal system 36. The steam driven vapor barrier system blankets the shaft of the pyrolysis unit in a pressurized blanket of steam, preventing other gases from escaping through the vapor blanket.

FIG. 3A shows a vapor barrier system 36 according to an embodiment of the present invention. The vapor barrier system 36 includes at least two vapor barrier collars 80, combined with at least one detecting chamber 82, that includes at least one sensor 84 for detecting resultant gases. In a preferred embodiment, the vapor barrier system comprises n vapor barrier collars and n–1 detecting chambers. In a further embodiment, n is 3. The detecting chamber 82 is disposed in between the vapor barrier collars 80 so as to detect any resultant gases that pass through the first vapor barrier collar. When the sensor 84 detects resultant gases in the detecting chamber, the vapor pressure applied to the collars 80 may be increased, with the most distant collar from the resultant chamber receiving the largest increase in vapor pressure, the second-most distant collar from the resultant chamber receiving the second largest increase in vapor pressure, etc., with the collar installed between the resultant chamber and the first detecting chamber receiving no additional pressure until the resultant gases are forced from the detecting chambers 82 into the resultant chamber 64. Preferably, the pressure in each collar 80 increases non-linearly as one moves outward from the resultant chamber 64.

Figure 3B:
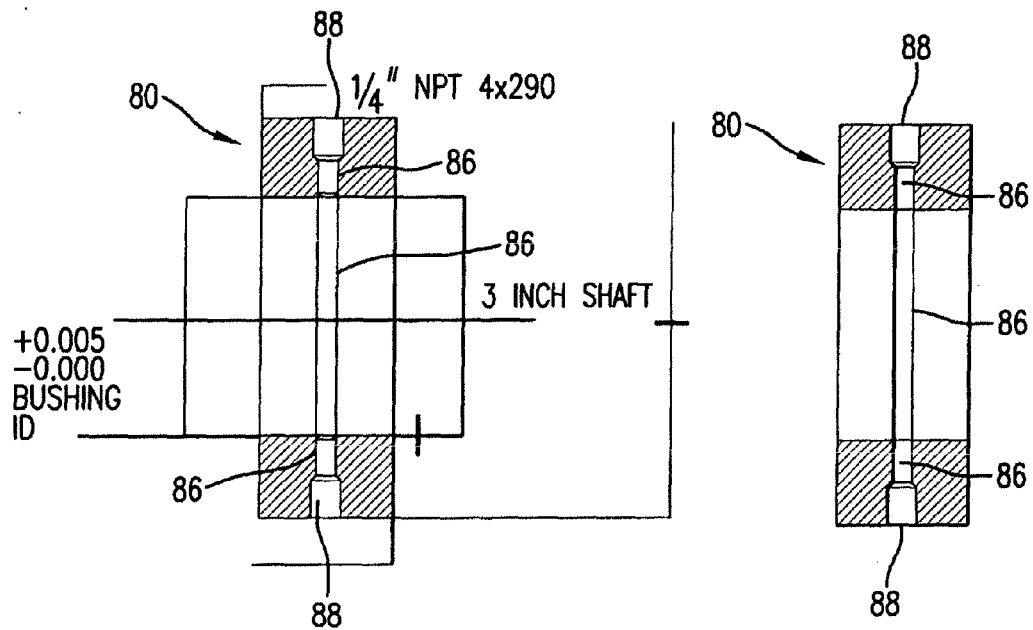
FIGS. 3B and 3C show cross-sectional and front views of a vapor barrier collar for use in a vapor barrier seal system according to an embodiment of the present invention.
Figure 3C:
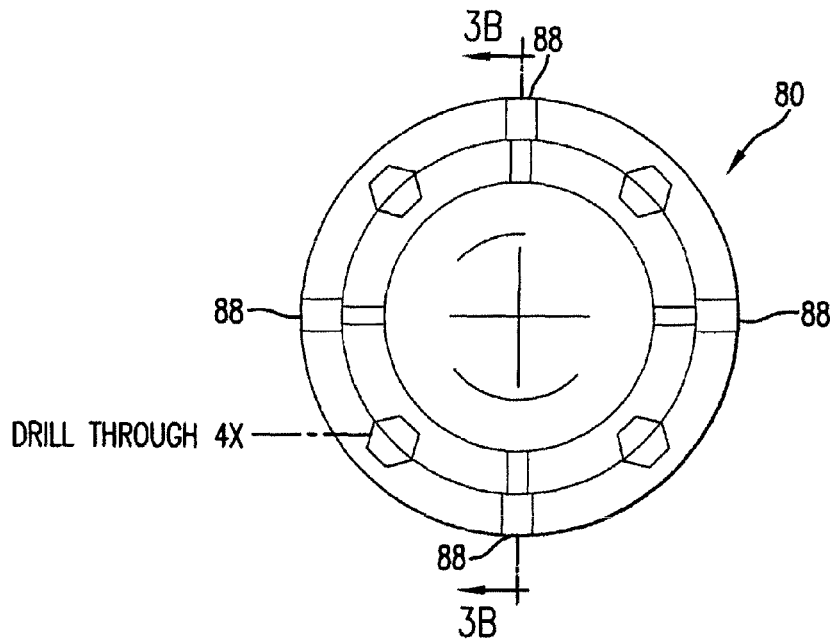

FIGS. 3B and 3C show cross-sectional and front views, respectively, of a vapor barrier collar 80 according to an embodiment of the present invention. The vapor barrier collar 80 may be a stainless steel collar that encircles the shaft 38 of the auger 68 without itself touching the shaft. In one embodiment, there is no more than 1/100th of an inch between the auger shaft 38 and the vapor barrier collar 80, and preferably fewer than 5/1000ths of an inch between the vapor barrier collar and the shaft. Vapor pressure is supplied to the gap between the collar 80 and the shaft through the body of the collar through an annular groove 86 formed about the inner circumference of the collar fed by one or more holes 88 drilled through the collar, with four radial holes being preferred. Alternatively, vapor may be applied from the collar to the shaft through one or more nozzles located about the inner circumference of the collar, or any other suitable gas or vapor delivery mechanisms. When vapor pressure is applied, vapor flows through the holes 88 into groove 86 and outwards onto shaft 38, creating a mass flow of vapor in both directions along the shaft from the groove. Preferably, the vapor is steam, that preferably is kept at a temperature of about 500° F., in order to cool the vapor barrier collars 80 and shaft 38.

Referring again to FIG. 3A, the detecting chamber includes at least one sensor 84 capable of detecting resultant gases. The detecting chambers 82 effectively control the seal system by comparing the pressure in the resultant chamber 64 with the pressure in the detecting chambers and generating pressure through the vapor barrier collars 80 in order to drive the resultant gases from the detecting chamber into the resultant chamber if necessary. In a preferred embodiment, the sensor 84 is a pressure sensor, that provides information regarding the pressure in the detecting chambers. In another embodiment, the sensor 84 is an infrared resultant gas sensor. The infrared resultant gas sensor 84 may include sapphire lenses on two opposite walls of the detecting chambers 82, such that infrared transmission through the lenses, and thus through the chamber, is disrupted and sensed on the receiver side if resultant gases have leaked into the chamber. In a further embodiment, the detecting chambers 82 include both a pressure sensor and an infrared resultant gas sensor. However, those skilled in the art will appreciate that any method of detecting the resultant gases may be applied.

The vapor barrier system 36 is advantageous for three reasons. First, it prevents the resultant gases from escaping into the atmosphere, thereby preventing the loss of gaseous products from the system. Second, it maintains safety, since the resultant gases in the resultant chamber are well above the flash temperature for such gases; were the resultant gases to escape from the combustion chamber, it could create an explosion or other dangerous condition. Third, and finally, it enables the use of an auger drive for high-temperature applications. Since the bearings used with the auger shaft 38 would not withstand the temperatures in the pyrolysis unit 12, it is necessary place the bearings sufficiently far from the pyrolysis unit such that they may be maintained at a temperature the bearings may withstand. Furthermore, the steam blanket cools the auger shaft 38, enabling the use of lower-temperature-rated bearings on the auger shaft. The vapor barrier seal 36 enables one to seal the pyrolysis unit 12, while locating the drive mechanism and bearings for the auger well outside of the pyrolysis unit. Such seals 36 may be established at the penetration point of the auger shaft 38 into the high-temperature pyrolysis unit 12, as well as the exit point of the auger shaft from the high temperature pyrolysis unit.

Figure 1B:
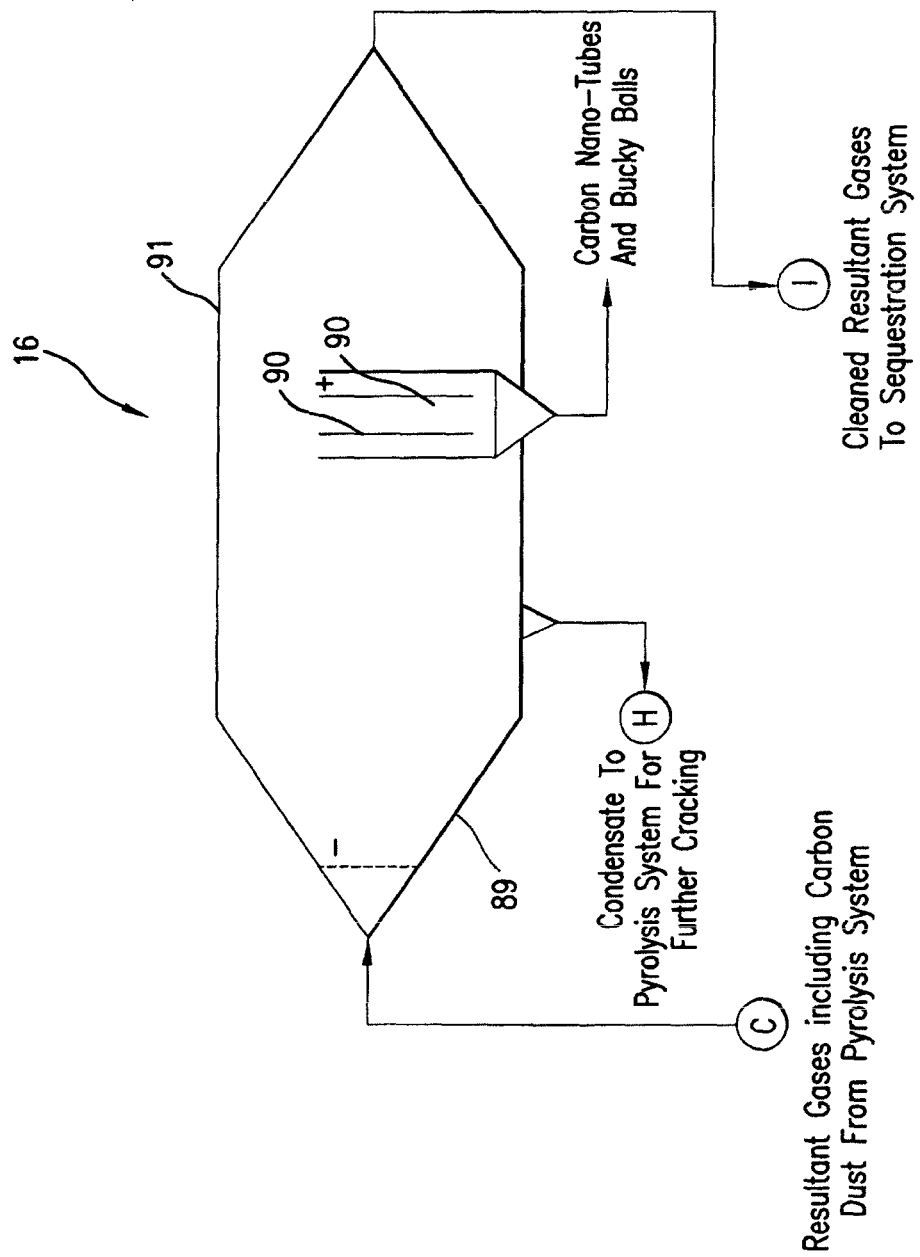
FIG. 1B is a schematic diagram showing a carbon dust clarifier for use in a pyrolysis system and method according to an embodiment of the present invention.
Figure 1C:
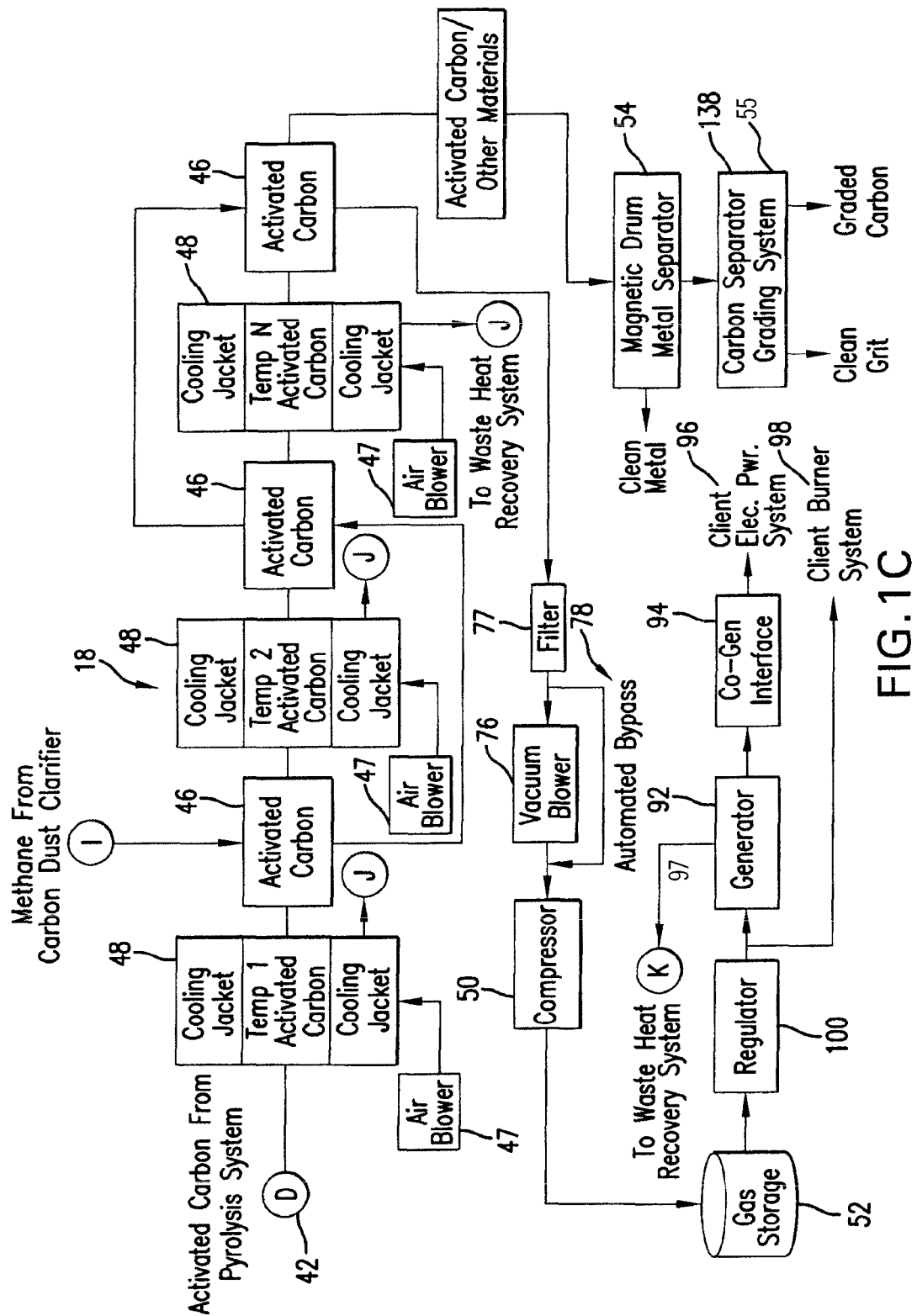
FIG. 1C is a schematic diagram showing a filtration and sequestration system for use in a pyrolysis system and method according to an embodiment of the present invention.

Referring to FIG. 1B, a further aspect of the invention is using high-temperature pyrolysis of feed stocks to generate and capture carbon nanostructures. Upon exiting the resultant chamber 64, the resultant gases 40 often contain a significant amount of carbon dust, that contains significant concentrations of carbon nanostructures, including (but not limited to) carbon nanotubes and fullerenes, such as $C_{60}$ "bucky balls." These nanostructures may be removed from the resultant gases through use of a dust clarifier 16. The dust clarifier 16 isobarically slows the flow rate of the resultant gases by increasing the volume of the gas, imparts a charge to the carbon nanostructure in the expansion nozzle 89, and then collects the carbon nanostructures on charged plates 90. The voltage differential used may be between about 1 and about 1,000 V. However, any suitable means of separating carbon dust from gaseous material known in the art, such as those using electrostatic forces or centrifugal forces, may be used. The clarified gases are then directed out of the dust clarifier 16. The carbon nanostructures may then be packaged and prepared for shipping, or subject to further purification steps. In a further embodiment of the invention, the dust clarifier 16 may separate materials that require further pyrolysis 44 from the resultant gases and carbon nanostructures and reintroduce these materials into the high-temperature pyrolysis unit.

Referring to FIG. 1C, a further aspect of the present invention is to purify the resultant pyrolysis gases by filtering them through activated carbon in filtration and sequestration system 18. This allows the production of cleaner gaseous resultants from the pure pyrolysis process than those produced by earlier pyrolysis processes. In a further embodiment, the noxious gaseous materials are sequestered in the active process through the "Lewis Acid Site" sequestration system and then after the resultant chamber filtered through multiple filter units 46 containing activated carbon beds at different temperatures. At the resultant chamber location, the gas analysis control unit applies appropriate amounts of "Lewis acid Site" sequestration agent(s) through the injector 25 to remove all of the stable Hg+2 compounds in the high temperature pyrolysis chambers. By further filtering the resultant gases through multiple activated carbon beds 46 at different temperatures, one may control which impurities are absorbed by the activated carbon. For instance, at high temperatures in the active pyrolysis process, impurities such as mercury (II) sulfide (HgS) are chemically bonded, through chemisorption, on Lewis acid sites in the activated carbon, while other impurities, such as mercury (I) compounds and other noxious compounds, may be captured in the lower-temperature activated carbon sorbent bed stages of the filtering process. Chlorine or other halogens present in the carbon will also be chemically bonded in the high-temperature pyrolysis process stages, that will further activate the Lewis acid sites in the activated carbon. Furthermore, because the amount of oxygen introduced into the pyrolysis process is tightly controlled, the resultant gases have a very low concentration of $SO_2$ and $NO_2$; as such, there is little to no formation of $H_2SO_4$ or $HNO_3$, that could poison the Lewis acid sites on the carbon and impede chemisorptions in the high-temperature pyrolysis process. In addition, the activated carbon will absorb various other impurities through physiosorption, wherein chemicals become trapped in the highly pitted surface of the activated carbon. The chemisorption and physiosorption functions of the activated carbon serve not only to remove and sequester noxious impurities from the resultant gases, but also to sequester these impurities in the activated carbon, thus preventing them from escaping into the environment or seeping into groundwater.

In a further embodiment of the invention, the activated carbon used to filter the resultant gases may be the activated carbon resulting from a low or high-temperature pyrolysis process. This reduces the cost of filtration in addition to enabling one to produce activated carbon with specific physical and chemical properties in the high-temperature pyrolysis process. Activated carbon is first produced by high-temperature pyrolysis of an organic feedstock, followed by lower temperature stages. The high-temperature pyrolysis process facilitates the creation of Lewis acid sites on the carbon atoms, that are necessary for absorption of noxious chemicals. The resultant activated carbon is moved from the resultant chamber by means of a tubular conveyor in the form of an auger in a pipe or tube, or other suitable conveyor or conveyance mechanism, and is preferably directed through at least one cooling/heating jacket 48, that may surround the conveyor tube. Air is blown through the jacket 48 by means of a blower 47; waste heat from the cooling/heating jacket enters the waste heat recovery system, described later herein. The cooling/heating jacket 48 may be used to reduce the temperature of the activated carbon to a predetermined first temperature. The cooled activated carbon is then directed through a first filtering stage 46 in the form of a sorbent bed chamber, through which the resultant gases are allowed to pass. The sorbent bed chamber may have mesh ports or gratings in the conveyance tube to allow gas to pass through the activated carbon. In a further embodiment, the activated carbon then passes through a second cooling/heating tube 48 to bring the activated carbon to a second, predetermined temperature. The activated carbon may then pass again through a second filtering stage in the form of a sorbent bed chamber to remove and sequester a second set of impurities from the resultant gases. Preferably, the resultant gases are passed through three different sorbent bed chambers with activated carbon at three separate temperatures. Preferably, each of these filtering stages 46 has a progressively lowered temperature, ranging from about 2,000° F. to about 700° F. In general, the gas residence times during these stages are slow and the activated carbon beds used are large. Advantageously, the activated carbon beds are continuously refreshed through the conveyance mechanism. As a result, noxious materials are serially cleansed from the methane gas through chemisorption and physiosorption.

The sorbent bed chambers are in fluid communication with a filter 77, a vacuum blower 76, and a compressor 50 operable for maintaining the slight positive pressure in the overall system. Preferably, this positive pressure maintenance system incorporates an automated bypass 78 and is monitored and controlled by the communications and control system receiving the differential pressure sensing data from within the resultant chamber 64. The gas is then collected in a gas storage tank 52 and selectively delivered to a regulator 100, a generator 92, and a co-generation interface 94. The result is gas delivery to a client burner system 98 or a client electrical power system 96. Optionally, exhaust from the generator 97 is also delivered to the waste heat recovery system 56. On the solid side, the activated carbon and other materials are conveyed to a magnetic drum metal separator 54, yielding clean metal products, and a carbon separator grading system 55, yielding clean carbon grit and graded carbon products.

In a preferred embodiment of the system, two or more high-temperature pyrolysis units 12 are operated in parallel. Each high-temperature pyrolysis unit 12 accepts a different feedstock 24, that results in different resultant materials. For example, a first high-temperature pyrolysis unit may be operated to pyrolize coal or coal tars, while simultaneously operating a second high-temperature pyrolysis unit to pyrolize municipal solid waste or biomass. By running two pyrolysis units in parallel, one may further extend the range of feedstocks that such a system may accept.

Figure 4A:
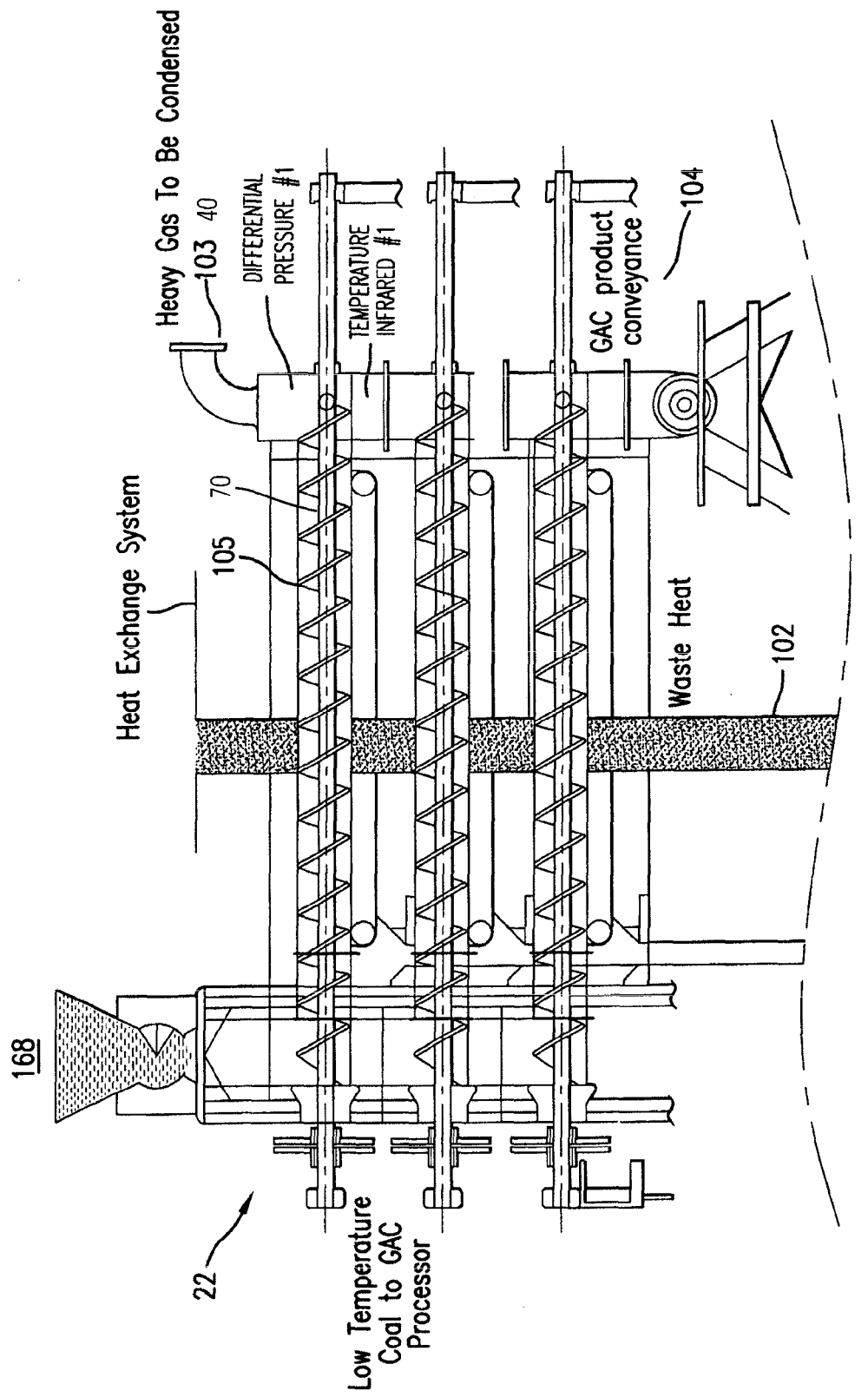
FIGS. 4A and 4B are a cross-sectional views of a combined cycle carbonaceous feedstock conversion system, wherein waste heat from a high-temperature pyrolysis unit is used to drive a low-temperature granulated activated carbon process according to an embodiment of the present invention.
Figure 4B:
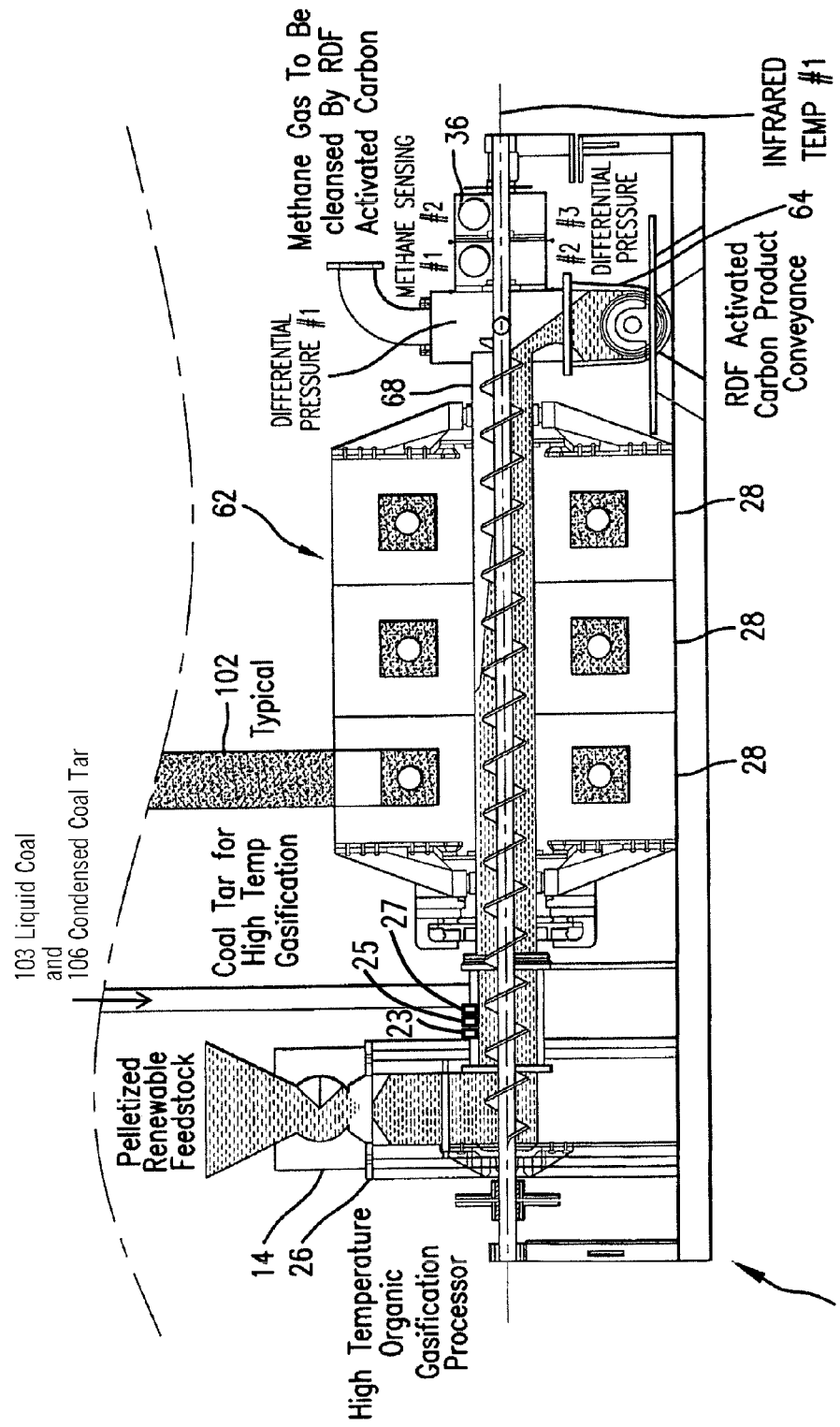

In a further embodiment of the invention, shown in FIG. 4A, a low-temperature granulated activated carbon (GAC) system 22 is coupled with a high-temperature pyrolysis unit 12. The coupling may occur by using the waste heat from the exhaust ports 32 of the high-temperature pyrolysis unit 12 to drive the second, low-temperature pyrolysis unit 22, e.g., as shown in FIG. 4. The high-temperature pyrolysis process may operate at temperatures in between about 700° F. and 2300° F.; a low-temperature pyrolysis process, such as the low-temperature granulated activated carbon process 22, or a batch distillation process for turning vehicle tires into fuel oils and steel 20, may operate at temperatures ranging from about 300° F. to about 700° F. Coupling the high-temperature pyrolysis process with a low-temperature pyrolysis process in a combined cycle pyrolysis system extends the range of organic and synthetic materials that may be pyrolized in the system, as well as an extended range of resultants beyond either the high or low temperature process alone. For instance, in the high-temperature pyrolysis process, the process may use continuous input of feedstock consisting of smaller particles; bulky feed stocks (such as automobile tires) may need to be shredded, frozen, torn, or otherwise reduced to a smaller size to be pyrolized in the high-temperature pyrolysis unit resulting in excessive energy used for feedstock size reduction. Likewise, low-temperature pyrolysis is unsuitable for feedstocks such as municipal solid waste, that has noxious materials that need to be pyrolized at higher temperatures in order to remove impurities. In addition, low-temperature pyrolysis of certain feed stocks, such as coal, results in tars that must be converted into gaseous resultants by a high-temperature pyrolysis process. As such, the two systems may operate synergistically, since the high-temperature pyrolysis process provides heat to drive the low-temperature pyrolysis process through heat ducting 102, and the low-temperature pyrolysis process may generate feedstock that may be used in the high-temperature pyrolysis process.

In a further embodiment of the invention, as shown in FIG. 4A, the multi-pass (1-n) conveyance mechanism may be used in the high-temperature pyrolysis system 12. In this embodiment, the triple pass or (1-n) pass feedstock conveyance through the heating chambers accommodates feed stocks requiring long dwell time for complete gasification.

Figure 1D:
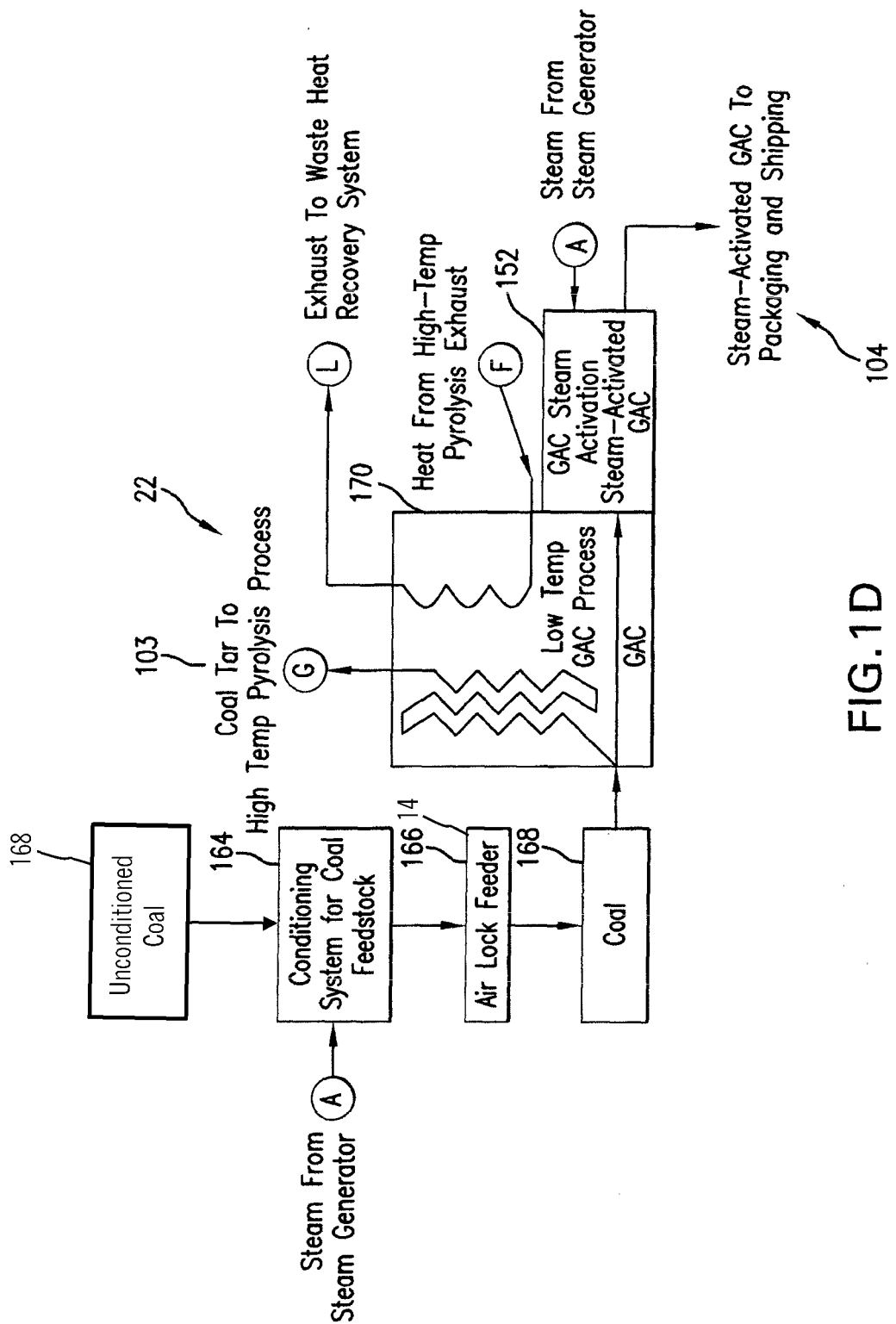
FIG. 1D is a schematic diagram showing a low temperature granulated activated carbon (GAC) process that may optionally be coupled with a high-temperature pyrolysis system according to an embodiment of the present invention.

A low-temperature GAC pyrolysis process 22 is shown in FIG. 1D. The coal feedstock 168 is first passed through a drying and conditioning system 162 utilizing steam emanating from the steam generator 60, and then through an airlock feeder 14. The GAC is steam-activated 152 also utilizing steam emanating from the steam generator 60. All exhaust from this process is routed to the waste heat recovery system 56. Thus, the present invention provides a combined cycle continuous high temperature pyrolysis system that uses the waste heat of the continuous high temperature pyrolysis system 12 to fuel the low temperature technologies. This extends the range of organic or synthetic inputs that may be used, as well as the range of resultants that may be achieved. A symbiotic relationship results. For example, the continuous high temperature pyrolysis system typically requires a limited particle size input, that is no longer absolutely required, and the low temperature GAC process 22 provides coal tar that may be used to elevate the BTU value of the resultant gases.

Figure 1E:
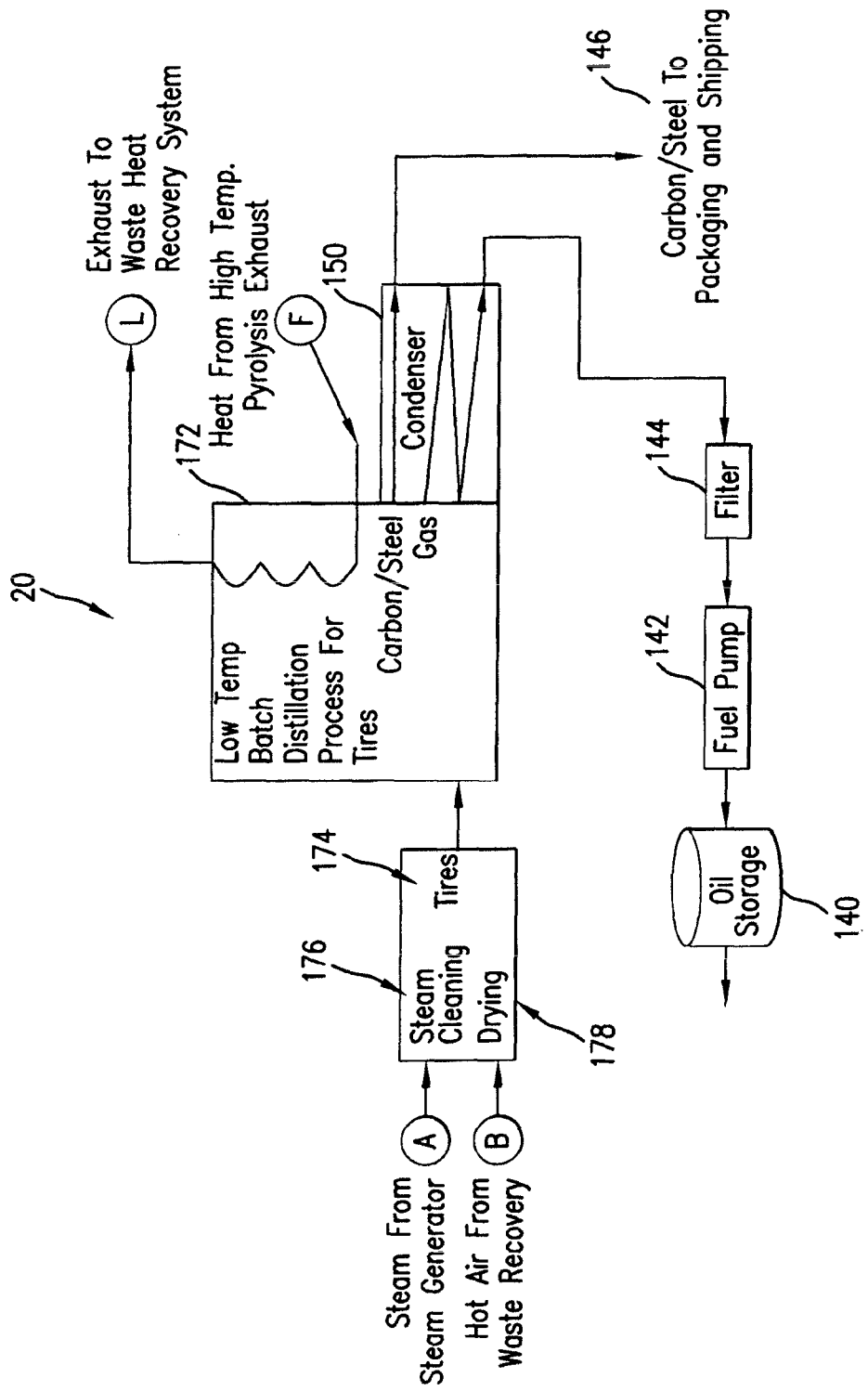
FIG. 1E is a schematic diagram showing a low-temperature batch distillation process for vehicle tires or like feedstocks that may optionally be coupled with a high-temperature pyrolysis system according to an embodiment of the present invention.

In a preferred embodiment, the continuous high-temperature pyrolysis unit waste heat may be used to drive either a low-temperature pyrolysis process 22 for production of granulated activated carbon (GAC) and coal tar, as is shown in FIG. 1D, or a low-temperature pyrolysis vacuum distillation process 20, as is shown in FIG. 1E, or both. Referring again to FIG. 1D, the low-temperature GAC process uses coal 168 as a feedstock and obtains liquid coal tars 103 and condensed coal tars 106 and granulated activated carbon 104 as products; steam may be used to further activate the activated carbon product as well. The coal tars may be introduced into the high-temperature pyrolysis unit 12, as described above, to convert them into combustible gases.

Referring now to FIG. 1E, in one exemplary embodiment, a low temperature batch distillation unit 20 for processing vehicle tires or the like is selectively coupled with the continuous high temperature pyrolysis system 12 (FIG. 1A). The low temperature batch distillation unit 20 includes a low temperature batch distillation process 172 that separates carbon and steel, that are delivered to a carbon/steel packaging and shipping mechanism, from gas, that is delivered to a condenser 150. For each rubber compound, the temperature/vacuum is set for sublimation into gas, starting with the lowest vapor pressure rubber or synthetic material in the group and progressing up until all of the different rubber or synthetic types are sublimated, leaving only the fixed carbon and steel, if the tires contain steel. The tires 174 processed are first steam cleansed 176, and subsequently hot air dried 178, using steam and hot air emanating from the waste heat recovery system, described in greater detail herein below. The condensed gas is pumped through a filter 144 by a fuel pump 142, and stored in an oil storage container 140 for later shipping and use. In the case of tires, great amounts of energy would have to be expended to tear, freeze and break, or otherwise reduce the tires to an acceptable input size for use with the continuous high temperature pyrolysis system 12. For this lower temperature technology, the tires may simply be rolled or placed inside the low temperature batch distillation process chamber, with no preparation other than the cleaning of the tires to remove objectionable materials, such as dirt and other debris. The low temperature batch distillation system 20 would not, however, be suitable for the processing of municipal solid waste, that typically contains objectionable materials that should be pyrolyized at much higher temperatures—for complete disassociation into safe elements and compounds that may be sequestered, such that there is no leaching into the ground water system if a land field is used for reclamation, for example. Likewise, the low temperature batch distillation process is not suitable for granular activated carbon (GAC) production due to its lack of coal tar-handling ability. Thus, the present invention provides a combined cycle continuous high temperature pyrolysis system that uses the waste heat of the continuous high temperature pyrolysis system 12 to fuel the low temperature technologies. This extends the range of organic or synthetic inputs that may be used, as well as the range of resultants that may be achieved. A symbiotic relationship again results.

Figure 1F:
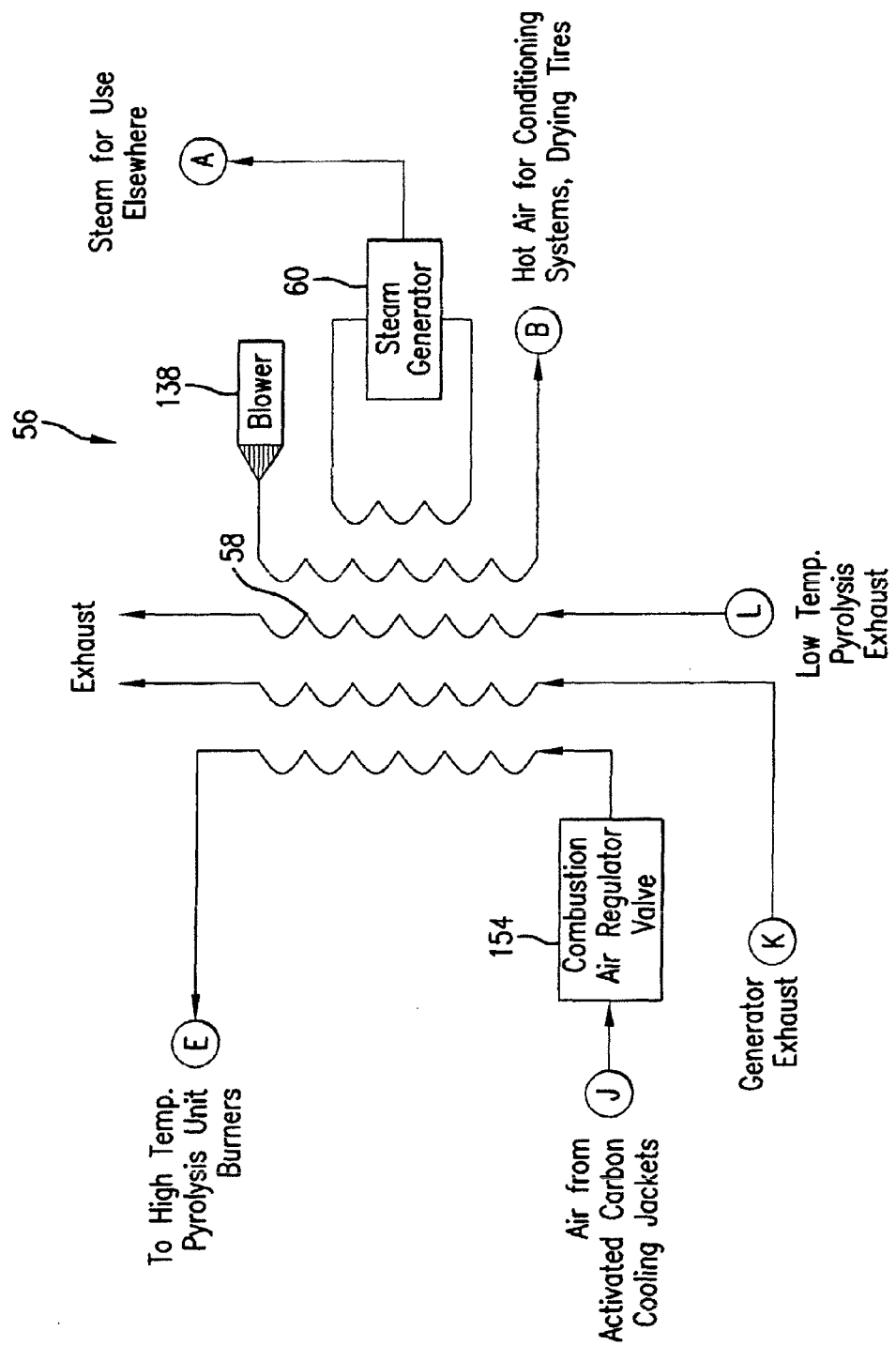
FIG. 1F is a schematic diagram showing a waste heat recovery system that collects waste heat from a pyrolysis system and method according to an embodiment of the present invention.

Referring to FIG. 1F, the waste heat from the high-temperature pyrolysis unit 12 may also be recovered through a waste heat recovery system 56. The waste heat recovery system includes at least one heat exchanger 58, that may be coupled with other devices, such as a steam generator 60 to generate steam, or a blower 138 to generate hot air. Steam produced by the steam generator 60 may be used to provide steam to other portions of the system including, but not limited to, steam for the high-temperature pyrolysis process, displacement of air in the airlock feeder 14 in the high-temperature pyrolysis process, for the vapor barrier system 36 surrounding the auger shaft 38, for use in a combined cycle turbine to produce electricity, or for automobile tire steam cleaning 176 so they may be used as a feedstock for the low-temperature pyrolysis vacuum distillation process. Steam injector 26 may also be used to provide steam for the high-temperature pyrolysis process; steam reformation is necessary because it provides hydrogen atoms necessary for the production of methane, ethane, and other desirable hydrocarbon gases. Likewise, coupling a blower 138 to the waste heat recovery system generates hot air, that may be used for the conditioning system 162 for organic or synthetic feedstock prior to introducing it into the high-temperature pyrolysis unit 12 or to control the activated carbon beds' temperature used to filter the resultant gas stream. Waste heat may also be reintroduced into the burners 30 of the high-temperature pyrolysis unit 12 by routing the air from cooling/heating jackets 48 through the waste heat recovery system 56 and providing it to the burner in the form of air for combustion. This increases efficiency of the high-temperature pyrolysis unit.

Pyrolysis of certain feed stocks in the high-temperature pyrolysis unit 12 may result in particular products that are not obtained with other feed stocks. One novel product that has been obtained is a non-wetting carbon. This non-wetting carbon resultant has pores that are opened during the pyrolysis process and subsequently sealed with silica, that may optionally be added during the processing of solid waste, if necessary. This non-wetting carbon floats and demonstrates desirable non-absorptive properties. Manufacturing typically involves opening cavities within the fixed carbon or coal feedstock during extremely fast pyrolyzation, followed by resident silica fusing to seal the opened cavities. Coal that is rapidly pyrolized between about 900° F. and about 2300° F., and preferably at about 2000° F., may form sealed cavities created by fused silica during the rapid pyrolyzation process. In addition, non-wetting carbon may be produced by pyrolizing other organic feed stocks while introducing silica or other non-wetting agents into the feedstock stream. Typical key properties of the non-wetting activated carbon are shown in Table 1.

TABLE 1

| Sample | Char Run |
|---|---|
| Moisture, Leco, Wt % | 1.9 |
| Ash, Leco, d.b., Wt. % | 12.9 |
| VCM, Wt. % | 4.1 |
| VFAD, d.b., g/ml | 0.393 |
| pH, Granular, d.b. | 7 |
| Molasses D.E. as is | ~0 |
| Iodine Number, d.b., mg/g | ~0 |
| Particle Density, d.b., g/ml | 1.28 |
| Helium Density, d.b., g/ml | 1.72 |
| Skeletal Volume, d.b., ml/g | 0.58 |
| Total Pore Vol., d.b., ml/g | 0.20 |
| Rotap Screen Analysis, Wt. % | |
| +½ inch | 6.6 |
| ½ inch × 3.5 mesh | 68.2 |
| 3.5 × 4 mesh | 7.7 |
| 4 × 5 mesh | 4.9 |
| 5 × 6 mesh | 3.5 |
| −6 mesh | 10.0 |

This non-wetting carbon may be used as a filler to waterproof materials such as lumber. A further aspect of the invention is a moisture resistant composite lumber utilizing a non-wetting carbon as a filler and recycled plastic, such as high density polyethylene (HDPE), as the binder for a moisture resistant composite lumber. The non-wetting carbon is perfectly suited for superior composite lumber that is void of the moisture induced problems of presently manufactured composite lumber. The fungus, mildew, and moisture expansion problem of existing composite lumber are eliminated due to moisture resistance of the non-wetting carbon filler of this invention.

In another embodiment, the invention comprises a control and data gathering system for a pyrolysis plant. An objective of the invention is to use layers of communications control and data gathering for the control of the individual pyrolysis units and other aspects of the system and for operation of the entire system. In a further embodiment, the control system may extend control over operation of at least one system in a municipality, or multiple systems within a region. In a further embodiment, the control system provides uniform and standard instrumentation and data for the operation of plants on a regional and global basis. The objective is also to provide the energy and product data available from these regional plants in a historical block of profile data such that the gas and/or electrical energy data may be easily conformed to trading floor data models.

The pyrolysis plant control system comprises a communications protocol that is ISO layered to control and communicate with the process sensors in standard communications protocols through extended user defined tables, EDL (Exchange Data Language) structures, TDL (Table Definition Language) structures, and XML structures, such that individual machines, plants, municipalities, regions of plants, trading floors, and other entities may use energy block data. In one embodiment, an electronically controlled pyrolysis processor incorporates a TCP/IP protocol suite and an HTTP server to provide one-way and two-way access to the sensor data. In another embodiment, the TCP/IP protocol suite may be incorporated into a gateway, serving multiple pyrolysis processing units and associated sensors and for transmission of data to individual pyrolysis units and associated sensors. The associated sensors (End Devices) use a female IEEE 1703 communications receptacle that allows connectivity to a male IEEE 1703 over IP communications module. The male IEEE 1703 communications module may incorporate any other lower layer communications media or network for the data/control communications delivery. In a further embodiment, the control system may use a common gateway interface for remote access to pyrolysis unit data and to set pyrolysis unit parameters using HTML forms in HTTP browsers, remote reading and setting of multiple pyrolysis parameters using a TCP/IP protocol suite, a TCP/IP protocol suite implemented in designated nodes in a CEBus LAN with remote access through TCP/IP to routers and bridge routers and to individual pyrolysis units on the LAN; and an SLIPP-PPP enabled gateway for remote TCP/IP access through a serial interface to single or multiple pyrolysis unit parameters.

A further embodiment of the invention comprises a control and communications protocol for the entire pyrolysis plant. The control system is unique in that an integrated modular pyrolysis system may also include a Module Management System (MMS), such as Meter Data Management System (MDMS) and distributed database integration that may provide site-independent, network-independent end-to-end transparent real-time communication and control system that uses Transparent Bridging Enhancement Technology (TBET) and Transparent Speed Enhancement Signaling (TSES) methods required by high-speed real-time communications modules.

A further embodiment comprises transparent bridging enhancement technology. Transparent bridging technology facilitates registration of any communication system that uses the aforementioned communications standards across network segments that are otherwise unreachable to the communicating entities in a transparent manner, without requiring alteration to segment-based communication hardware, software, or firmware. The bridging technology comprises a pairing handoff protocol whereby the bridging hardware and software back off thus enabling peer-to-peer communication across network segments that were otherwise inaccessible during module registration phase, without the use of a relay.

This invention uses standard communications protocols to provide layers of communication. These communications protocols include, but are not limited to, IEEE 1377, IEEE1701, IEEE1702, IEEE1703, and IEEE 1704, the corresponding ANSI C12.19, ANSI C12.18, ANSI C12.21, and ANSI C12.22 protocols, the corresponding MC12.19, MC12.18, MC12.21, MC12.22, and MCP1704 protocols, and UCA/IEC 61850, ISO/IEC 62056-62, ISO/IEC 15955, ISO/IEC 15954, ISO/IEC 8824, ISO/IEC 8825, IANA TCP/UDP internet port 1153 or equivalent, and W3C XML, all of which are incorporated herein by reference. These communications protocols will, for the first time, provide seamless integration of energy generation and energy metering to an Advanced Metering Infrastructure (AMI).

The AMI is managed through the use of Standard or Manufacturer defined tables, user defined tables, extended user defined tables, standard procedures and manufacturing procedures, pending table and pending procedure, bi-directional messages and uni-directional messages (blurts). Data elements are encoded for use in global inter-system exchange, importation and exportation of control, data and parameters using the EDLs that are specified and are fully qualified using the TDLs for the creation and documentation of sensory data models and site-supervision configuration files using a global data registry. These are encoded using XML, TDL, and EDL structures that define a communication context, a system that is capable of connecting individual sensors, machines, plants, municipalities, geographical regions, regions of plants, and trading floors and other entities that use energy block data and time-critical sensory data.

An integrated modular pyrolysis system may also include an MMS and MDMS and databases to provide site independent, network independent end-to-end transparent real-time communication and control system. Process communication globalization enabling technology is provided by the invention's transparent bridging enhancement technology, that allows the control system to interoperate securely, privately and globally without undesired degradation of communication system performance, while maintaining the real-time capability. Transparent bridging brings together registering nodes and relays that otherwise could not intercommunicate directly with one another because they reside on sites that are located on different network segments that would otherwise require relays. Following the initial binding, the transparent bridges back off and no longer participate in communication and data transfers. The net effect is that network segments that would normally require relays in order to sustain communication do not require such relays, thus eliminating the need for hardware and/or software that may increase the cost of integration or decrease the overall efficiency of the system.

Figure 5:
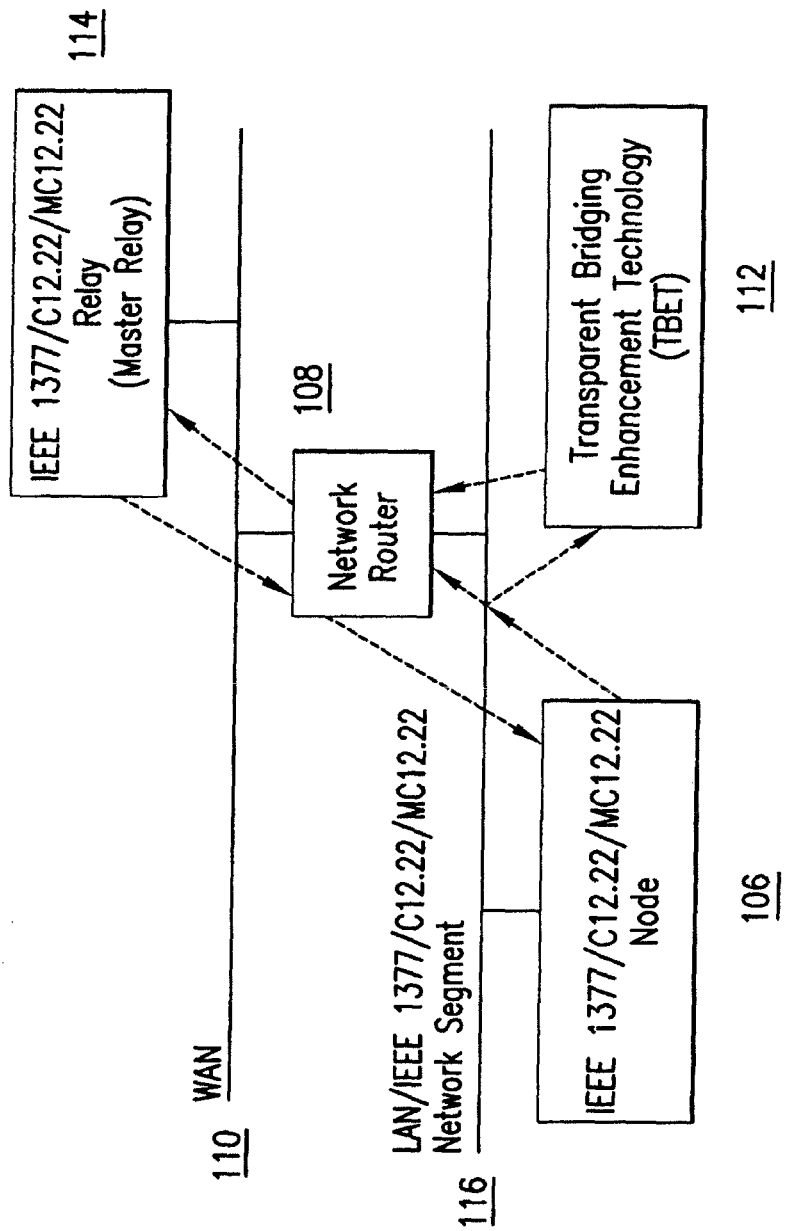
FIG. 5 is a schematic diagram showing a transparent bridging enhancement technology (TBET) that may be used in combination with a carbonaceous feedstock conversion system according to an embodiment of the present invention.

FIG. 5 shows a detailed drawing of the transparent bridging enhancement technology (TBET) logic used to link network nodes with relays that are not co-located on the same network segment as that of the nodes. Following the initial bridging activity the bridge is withdrawn, and the two network segments are "healed," thus effectively presenting relays to registered nodes as if the relay were to be co-located on the same network segment. In a preferred embodiment, an unregistered IEEE 1703/C12.22/MC12.22 node 106 broadcasts an ACSE PDU that contains an EPSEM Registration Service Request. The message contains the Node's source native network address. The network router 108 will not broadcast the request to the WAN 110 for security reasons or other connectivity restriction reasons. The TBET 112 receives the Node's registration request and it forwards it to the ApTitle of the IEEE 1703/C 12.22/MC 12.22 nearest Relay 114 (or master relay), through the network router 108, while masquerading as the originator of the message by using the Node's source native address as its own. On an internet, this is the Node's IP address. The relay 114 processes the registration request and responds to the originating Node 106 through network router 108. Finally, the Node 106 is properly registered. Any IEEE 1703/C12.22/MC 12.22 Node on the IEEE 1703/C 12.22/MC 12.22 local area network 116 may now locate and communicate with the registered node. The TBET 112 is no longer involved in these transactions and may be removed.

Figure 6A:
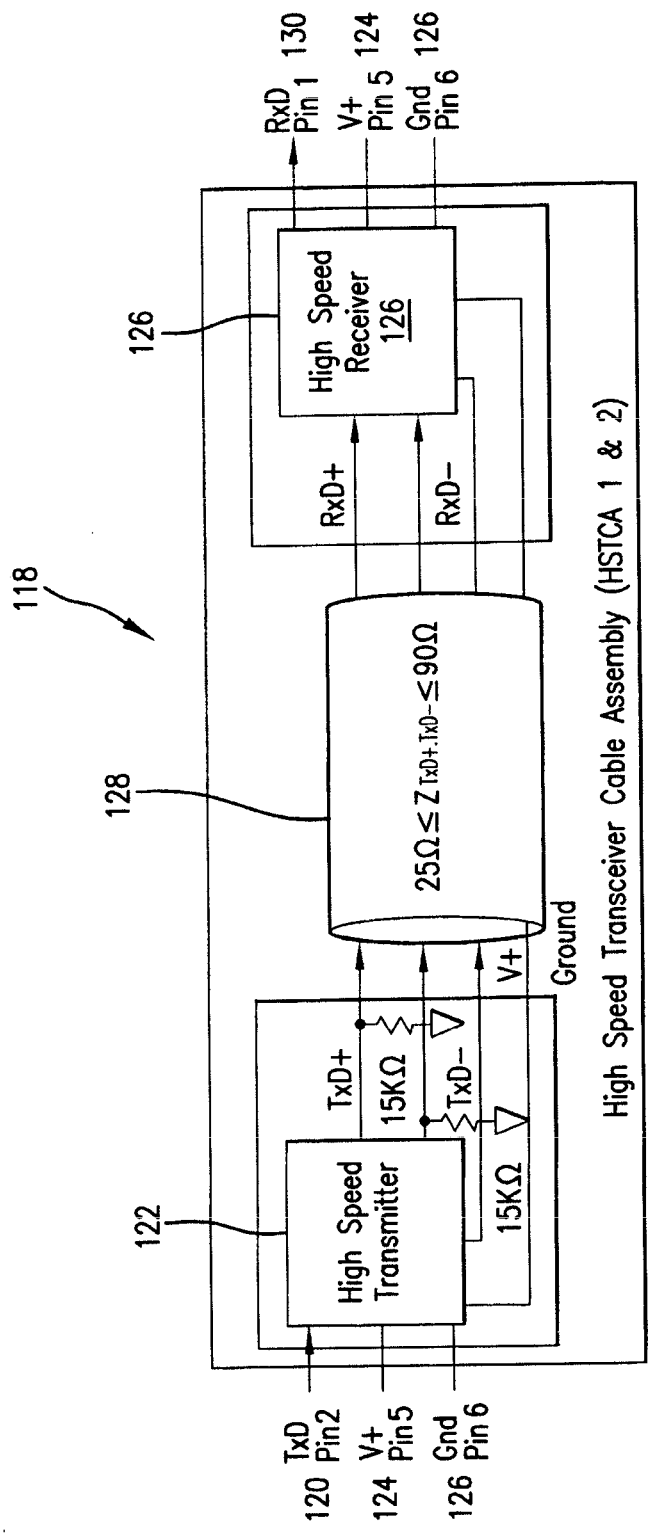
FIG. 6A is a schematic diagram showing a high-speed transceiver cable assembly that may be used to attach devices to communication systems in a carbonaceous feedstock conversion system according to an embodiment of the present invention.
Figure 6B:
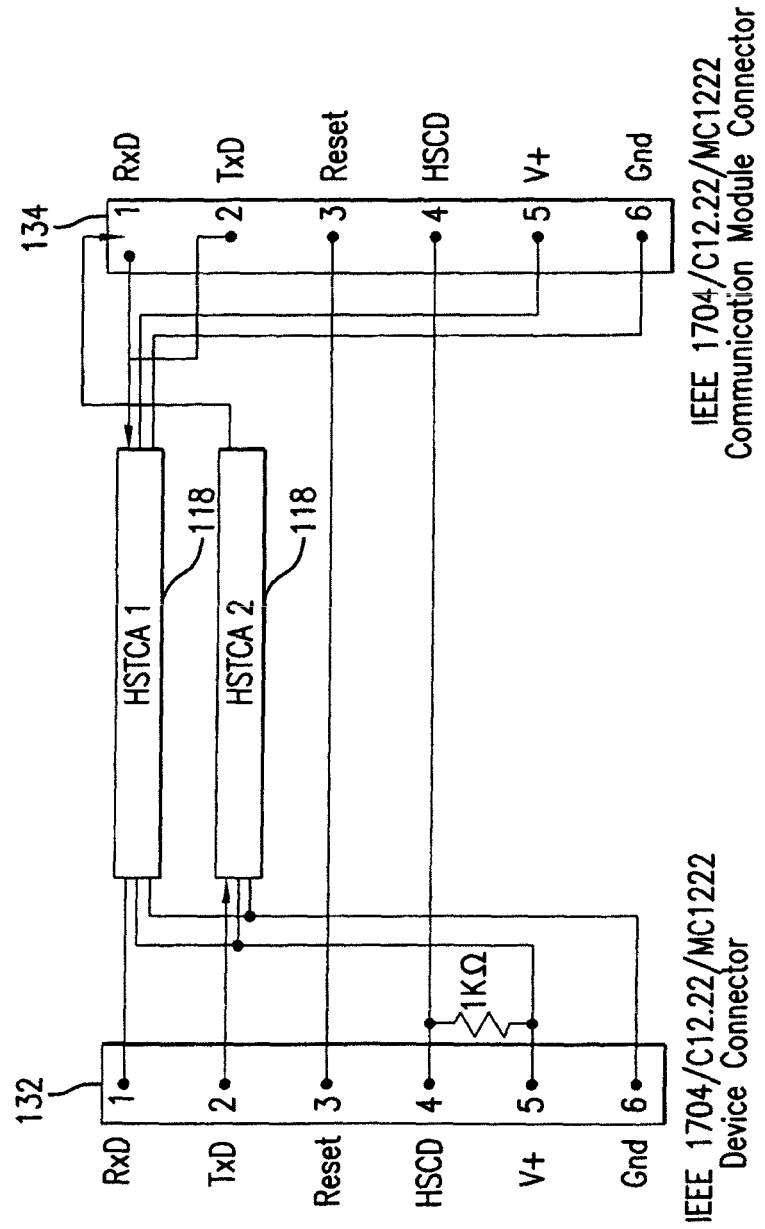
FIG. 6B is a schematic diagram showing a pair of high-speed transceiver cable assemblies connecting a device to a communication module according to an embodiment of the present invention.

The use of transparent speed enhancement signaling connections between sensor, control, and management devices and their corresponding communication module enables the use of connectors and interfaces that were otherwise limited in design to operate at slow to moderate speeds of 256,000 bits per second and distances of 1 m, to operate at speeds that are orders of magnitude faster (e.g. 4,000,000 bits per second or more) at distances greater than 1 m, transparently using existing serial asynchronous communication links. Another feature of this connection is that it provides the means to recognize the presence of such a high-speed link, thus enabling the detection and activation of the high-speed interface. FIG. 6A shows an example of a high speed transceiver system 118 using transparent speed enhancement cables 128 that may be used to attach devices to communication modules that are compliant with IEEE 1703, ANSI C12.22, or MC12.22 communication module interface requirements and maintain better than 4% of bit period maximum at the connector sites. The high speed transceiver system 118 accepts inputs from the TxD pin 120 of an IEEE 1703, ANSI C12.22, or MC12.22 device into high speed transmitter 122, along with V+ 124 and Ground 126. These signals are transmitted through a cable 128, that outputs RxD+ and RxD− to high-speed receiver 126, that then outputs to RxD pin 130, V+ 124, and Ground 126 of an IEEE 1703, ANSI C12.22, or MC12.22 device. FIG. 6B shows two high-speed transceiver cable assemblies 118 interposed between an IEEE 1703, ANSI C12.22, or MC12.22 Device Connector 132 and an IEEE 1703, ANSI C12.22, or MC12.22 Communications Module Connector 134. The use of the two assemblies enables high-speed communications from the device connector 132 to the communication module connector 134 and vice versa. This is just one example using a differential interface; other variations on this circuit or transmission method (e.g. fiber optics) are possible.

While the present invention has been particularly taught and described with reference to certain preferred embodiments, those versed in the art will appreciate that minor modifications in form and detail may be made without departing from the spirit and scope of the invention.

What is claimed is:

1. A process for the controlled gasification of a carbonaceous feedstock, comprising:
   pyrolizing the feedstock by conveying the feedstock through a retort surrounded by a plurality of successive heating chambers each comprising an axially adjustable chamber separation wall and each operated at a predetermined temperature, wherein a predetermined dwell time of the feedstock in each of the plurality of successive heating chambers is controlled by a conveyance rate of the feedstock through the retort and a position of each of the axially adjustable chamber separation walls to produce a gas product and a solid product, wherein the gas product comprises methane and noxious chemicals and the solid product comprises carbon; and
   controlling the pyrolizing step using feedback related to constituents of the gas product, thereby providing a predictable and stable gas product from the feedstock.

2. The process of claim 1, further comprising removing at least some of the noxious chemicals from the gas product using activated carbon as a filtering medium, wherein the removing step occurs at a controlled temperature.

3. The process of claim 1, further comprising injecting steam into or about the feedstock prior to or concurrent with the pyrolizing step.

4. The process of claim 3, wherein the steam injecting step is performed responsive to and controlled based on the constituents of the gas product.

5. The process of claim 1, further comprising injecting viscous/liquid organic material into or about the feedstock prior to or concurrent with the pyrolizing step.

6. The process of claim 5, wherein the viscous/liquid organic material injecting step is performed responsive to and controlled based on the constituents of the gas product.

7. The process of claim 1, further comprising monitoring the gas product for BTU collective value per cubic foot and modifying the pyrolizing step accordingly.

8. The process of claim 1, further comprising injecting a sequestration agent into or about the feedstock prior to or concurrent with the pyrolizing step.

9. The process of claim 8, wherein the sequestration agent injecting step is performed responsive to and controlled based on the constituents of the gas product.

10. The process of claim 1, further comprising injecting a "non-wetting" agent into or about the feedstock prior to or concurrent with the pyrolizing step.

11. The process of claim 10, wherein the "non-wetting" agent injecting step is performed responsive to and controlled based on an analysis of the solid product.

12. The process of claim 2, wherein the removing step comprises removing at least some of the noxious chemicals from the gas product using activated carbon as the filtering medium in a plurality of steps, wherein the removing step occurs at a plurality of controlled temperatures.

13. The process of claim 2, wherein at least a portion of the activated carbon is obtained from the pyrolizing step.

14. The process of claim 1, wherein the pyrolizing step comprises conveying the feedstock through the plurality of chambers using one or more common augers disposed within the retort.

15. The process of claim 14, wherein the retort is rotated.

16. The process of claim 15, wherein the retort is rotated in a direction opposite a direction of rotation of the one or more augers.

17. The process of claim 14, further comprising maintaining a positive pressure in the retort.

18. The process of claim 2, further comprising collecting carbon nanostructures from the solid product prior to the removing step.

19. The process of claim 18, wherein the carbon nanostructures are collected by imposing an electrostatic charge on them and gathering them using an electrically-charged plate.

20. The process of claim 1, further comprising running a low-temperature liquefaction process using waste heat from the pyrolizing step.

* * * * *